(12) United States Patent
Machikawa et al.

(10) Patent No.: US 11,590,749 B2
(45) Date of Patent: Feb. 28, 2023

(54) FLEXIBLE PACKAGING MATERIAL

(71) Applicant: HEWLETT-PACKARD DEVELOPMENT COMPANY, L.P., Spring, TX (US)

(72) Inventors: Hajime Machikawa, Nes Ziona (IL); Liora Braun, Nes Ziona (IL); Chen Zigdon, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 70 days.

(21) Appl. No.: 16/607,446

(22) PCT Filed: Jan. 19, 2018

(86) PCT No.: PCT/US2018/014407
§ 371 (c)(1),
(2) Date: Oct. 23, 2019

(87) PCT Pub. No.: WO2019/143348
PCT Pub. Date: Jul. 25, 2019

(65) Prior Publication Data
US 2020/0338879 A1 Oct. 29, 2020

(51) Int. Cl.
*B32B 38/14* (2006.01)
*B32B 38/00* (2006.01)
(Continued)

(52) U.S. Cl.
CPC .............. *B32B 38/14* (2013.01); *B32B 7/12* (2013.01); *B32B 27/06* (2013.01); *B32B 37/12* (2013.01);
(Continued)

(58) Field of Classification Search
CPC ........ B65D 65/40; B65D 65/42; C09D 5/002; C09D 11/102; C09D 11/107; C09D 11/54;
(Continued)

(56) References Cited

U.S. PATENT DOCUMENTS 6,562,172 B1 * 5/2003 Kamen .................... B41M 1/34
428/210
6,852,422 B2 2/2005 Kendall et al.
(Continued)

FOREIGN PATENT DOCUMENTS

CN 1148007 A 4/1997
CN 106660352 A 5/2017
(Continued)

OTHER PUBLICATIONS

Product Guide, Waterborne and Solventborne Resins, Americas, "Liquid Coating Resins Product Guide", 2014, Allnex, 17 pages.

*Primary Examiner* — Linda L Gray
(74) *Attorney, Agent, or Firm* — HP Inc. Patent Department

(57) ABSTRACT

Described herein is a process for preparing a flexible packaging material. The process may comprise: providing a printed first flexible substrate comprising an ink composition on a surface of a first flexible substrate, the ink composition comprising a first thermoplastic resin; depositing a further composition comprising a cross-linker, a white pigment and a second thermoplastic resin onto the printed ink composition such that the thermoplastic resin of the ink composition is cross-linked; and laminating the first flexible substrate with a second flexible substrate such that
(Continued)

the ink composition, the further composition and the cross-linker are disposed between the first and second flexible substrates.

16 Claims, 1 Drawing Sheet

(51) Int. Cl.
    *B32B 7/12*     (2006.01)
    *B32B 27/06*     (2006.01)
    *B32B 37/12*     (2006.01)
    *B65D 65/40*     (2006.01)
    *B65D 65/42*     (2006.01)
    *C09D 5/00*     (2006.01)
    *C09D 11/102*     (2014.01)
    *C09D 11/54*     (2014.01)
    *C09D 11/107*     (2014.01)
    *B32B 37/24*     (2006.01)

(52) U.S. Cl.
    CPC ............ *B32B 38/145* (2013.01); *B65D 65/40* (2013.01); *B65D 65/42* (2013.01); *C09D 5/002* (2013.01); *C09D 11/102* (2013.01); *C09D 11/107* (2013.01); *C09D 11/54* (2013.01); *B32B 2037/243* (2013.01); *B32B 2038/0076* (2013.01); *B32B 2255/10* (2013.01); *B32B 2255/26* (2013.01); *B32B 2305/72* (2013.01); *B32B 2307/7244* (2013.01); *B32B 2439/70* (2013.01)

(58) Field of Classification Search
    CPC ......... B32B 38/14; B32B 38/145; B32B 7/12; B32B 27/06
    See application file for complete search history.

(56) References Cited

U.S. PATENT DOCUMENTS

| 8,704,258 | B2 | 4/2014 | Tasaki et al. | |
| 2002/0157777 | A1* | 10/2002 | Watanabe | B32B 37/12 |
| | | | | 156/251 |
| 2006/0235108 | A1* | 10/2006 | Koganehira | C09D 11/40 |
| | | | | 523/160 |
| 2011/0003096 | A1 | 1/2011 | Holbert et al. | |
| 2012/0074360 | A1* | 3/2012 | Funyuu | C08G 61/12 |
| | | | | 524/610 |
| 2013/0065029 | A1* | 3/2013 | Fujii | C09D 11/101 |
| | | | | 524/548 |
| 2013/0172183 | A1* | 7/2013 | Kwan | C09B 67/0097 |
| | | | | 503/201 |
| 2014/0026782 | A1* | 1/2014 | Chung | C09D 11/00 |
| | | | | 524/200 |
| 2015/0344732 | A1 | 12/2015 | Witt-Sanson et al. | |
| 2016/0185086 | A1 | 6/2016 | Hsu et al. | |
| 2017/0198158 | A1 | 7/2017 | Mathew et al. | |
| 2017/0321073 | A1* | 11/2017 | Yoo | B41J 3/407 |
| 2018/0019411 | A1* | 1/2018 | Otsuki | C07D 209/82 |
| 2018/0105710 | A1* | 4/2018 | Hong | C09D 11/328 |
| 2019/0048523 | A1* | 2/2019 | Or-Chen | D06P 1/5257 |

FOREIGN PATENT DOCUMENTS

| EP | 1743911 | 1/2007 |
| JP | 2005022173 A | 1/2005 |
| JP | 2016104842 A | 6/2016 |
| WO | WO2017062760 A1 | 4/2017 |
| WO | WO2017067610 A1 | 4/2017 |
| WO | WO2017067611 A1 | 4/2017 |

* cited by examiner

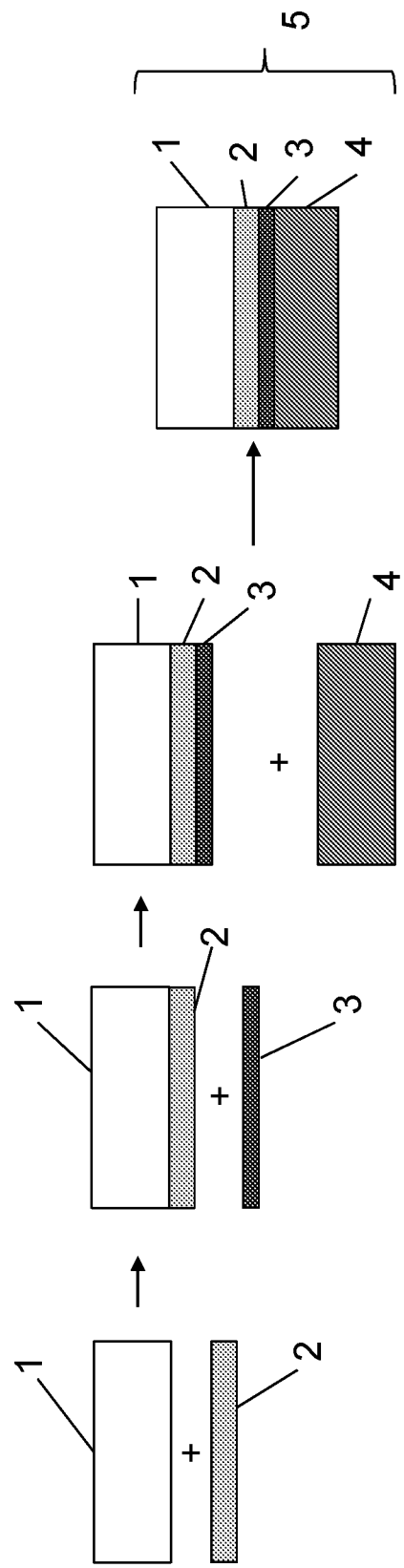

FLEXIBLE PACKAGING MATERIAL

BACKGROUND

All manner of consumer goods, in particular food products, are packaged using thin films or sheets of flexible packaging material, with images such as corporate branding, or product information printed onto the film. The flexible packaging material serves to protect the product from, for example, moisture, oxidation or pathogens, while also providing information to the user regarding the nature and origin of the product contained therein.

BRIEF DESCRIPTION OF THE FIGURES

FIG. 1 shows a schematic process for producing a flexible packaging material.

DETAILED DESCRIPTION

Before the present disclosure is disclosed and described, it is to be understood that this disclosure is not restricted to the particular process features and materials disclosed herein because such process features and materials may vary somewhat.

It is noted that, as used in this specification and the appended claims, the singular forms "a", "an", and "the" include plural referents unless the context clearly dictates otherwise.

As used herein, "carrier fluid", "carrier liquid", "carrier", or "carrier vehicle" refers to the fluid in which pigment particles, colorant, charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is generally suitable for use in an electrostatic printing process, sometimes termed an electrophotographic printing process. It may comprise pigment particles, which may comprise a thermoplastic resin.

As used herein, "pigment" generally includes pigment colorants, magnetic particles, aluminas, silicas, and/or other ceramics or organometallics, whether or not such particulates impart colour. Thus, though the present description primarily exemplifies the use of pigment colorants, the term "pigment" can be used more generally to describe not just pigment colorants, but other pigments such as organometallics, ferrites, ceramics, etc.

As used herein, "co-polymer" refers to a polymer that is polymerized from at least two monomers.

As used herein, "lamination bond strength" refers to the force (per length) required to delaminate a laminated material, and is expressed in units of Newton/inch, or N/in. The lamination bond strength can be measured according to standard techniques, in particular ASTM F0904-98R08. Unless otherwise stated, the lamination bond strength of a flexible packaging material described herein refers to the strength to delaminate the individual layers of the flexible packaging from each other.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used herein, "acidity", "acid number", or "acid value" refers to the mass of potassium hydroxide (KOH) in milligrams that neutralizes one gram of a substance. The acidity of a polymer can be measured according to standard techniques, for example, as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa·s or cPoise. In some examples, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400 V/μm, or more, in some examples, 600-900 V/μm, or more.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" may refer to nitrogen, oxygen, halogens, phosphorus, or sulfur.

As used herein, "alkyl" may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

As used herein, "alkyl", or similar expressions such as "alk" in alkoxy, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more, and may be selected from, phenyl and naphthyl.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable as would be understood in the art.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not just the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt. % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided a process for preparing a flexible packaging material. The process may comprise:

providing a printed first flexible substrate comprising an ink composition on a surface of a first flexible substrate, the ink composition comprising a first thermoplastic resin;

depositing a further composition comprising a cross-linker, a white pigment and a second thermoplastic resin onto the printed ink composition such that the thermoplastic resin of the ink composition is cross-linked; and laminating the first flexible substrate with a second flexible substrate such that the ink composition, the further composition and the cross-linker are disposed between the first and second flexible substrates.

In another aspect there is provide a flexible packaging material. The flexible packaging material may comprise:

a first flexible substrate;

a printed ink layer comprising a first thermoplastic resin disposed on the first flexible substrate, wherein the first thermoplastic resin is cross-linked;

a further layer comprising a white pigment and a second thermoplastic resin disposed on the printed ink layer; and a second flexible substrate laminated to the first flexible substrate such that the printed ink layer and the further layer are disposed between the first and second flexible substrates.

In another aspect, there is provided a flexible package. The flexible package may comprise: a flexible packaging material.

In some examples, the flexible package may comprise a flexible packaging material comprising:

a first flexible substrate;

a printed ink layer comprising a first thermoplastic resin disposed on the first flexible substrate, wherein the first thermoplastic resin is cross-linked;

a further layer comprising a white pigment and a second thermoplastic resin disposed on the printed ink layer; and a second flexible substrate laminated to the first flexible substrate such that the printed ink layer and the further layer are disposed between the first and second flexible substrates.

Flexible packaging materials are generally required to withstand various post-printing treatments, for example, aggressive heat sealing, as well as being required to be water resistant, chemical resistant and suitable for use in, for example, retort packages. Current flexible packaging materials can be produced by applying a transparent crosslinking composition onto a liquid electrostatically printed image prior to lamination. However, the majority of reverse printed flexible packaging materials involve the application of a white ink layer as the final colour layer of printed images (often called a mask layer). Thus, large quantities of liquid electrostatic white ink are applied over the entire flexible packaging material prior to application of the transparent crosslinking composition. This is a costly and time consuming final layer of electrostatic ink.

The present inventors have found that examples of the methods and products as described herein avoid or at least mitigate at least one of the difficulties described above. They have found that examples of the method and products are more successful than previous methods in that the materials and packages produced retain the high lamination bond strength of previous solutions whilst reducing the requirement for white electrostatic inks.

Flexible Packaging Material

In some examples, a flexible packaging material is described. The flexible packaging material may be produced by any of the methods described herein. Each component of the flexible packaging material will be discussed in the sections which follow.

In some examples, the flexible packaging material comprises a laminate structure with sufficient bond strength to avoid delamination of the layers, in particular delamination at the interface between the first flexible substrate on which a printed ink composition is disposed and the second flexible substrate. In some examples, the lamination bond strength is measured according to ASTM F0904-98R08. In some examples, the lamination bond strength is measured 7 days after lamination. In some examples, the lamination bond strength is measured 30 days after lamination. In some examples, the lamination bond strength is measured 7 days and 30 days after lamination or as required by the end user. In some examples, the lamination bond strength was measured 30 days after lamination. In some examples, the flexible packaging material has a lamination bond strength as measured by ASTM F0904-98R08. In some examples, the flexible packaging material has a lamination bond strength of at least about 1.0 N/inch, for example, at least about 1.5 N/inch, for example, at least about 2.0 N/inch, for example, at least about 2.5 N/inch, for example, at least about 3.0 N/inch, for example, at least about 3.5 N/inch, for example, at least about 4.0 N/inch, for example, at least about 4.5 N/inch, for example, at least about 5.0 N/inch, for example, at least about 5.5 N/inch, for example, at least about 6 N/inch, for example, at least about 6.5 N/inch, as measured by ASTM F0904-98R08. In some examples, the flexible packaging material has a lamination bond strength higher than the strength of the flexible packaging material such that the flexible packaging material tears prior to delamination.

In some examples, the flexible packaging material has a lamination bond strength of at least about 3.5 N/inch as measured by ASTM F0904-98R08.

Printed First Flexible Substrate

The printed first flexible substrate may comprise an ink composition on a surface of a first flexible substrate, the ink composition comprising a first thermoplastic resin. In some examples, the printed first flexible substrate may comprise a primer disposed between the ink composition and the surface of the first flexible substrate, the primer comprising a primer resin.

First Flexible Substrate (Print Substrate)

The first flexible substrate, to which an ink composition may be printed (and thus is also referred to herein as the print substrate) may be any material suitable for use in a lamination process, and suitable for use in a flexible packaging material.

Since the first flexible substrate forms the outermost layer of the final, laminated flexible packaging material as prepared in the methods described herein, in some examples, the flexible substrate is transparent in order that the printed image or information is visible to the consumer.

In some examples, the first flexible substrate comprises a film of a polymer, for example, a thermoplastic polymer. In some examples, the first flexible substrate comprises a film of biaxially oriented polypropylene (BOPP), polyethylene terephthalate (PET) or oriented polyamide (OPA). In some examples, the first flexible substrate comprises a film of biaxially oriented polypropylene (BOPP) or polyethylene terephthalate (PET). In some examples, the PET film may comprise PET-silicon oxide, PET-aluminium oxide, or PET-PVDC (PVDC: polyvinylidene chloride).

In some examples, the first flexible substrate comprises a thin film of a polymer, wherein the film is less than 100 µm in thickness, for example, less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In some examples, the film of polymer is about 12 µm in thickness.

In some example, the first flexible substrate comprises a thin film of a polymer, wherein the film is greater than 12 µm in thickness, for example, greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness, greater than 100 µm in thickness. In some examples, the film of polymer is about 100 µm in thickness.

In some examples, the first flexible substrate has a primer on a surface onto which the ink composition is printed. In some examples, the first flexible substrate has a first surface on which a primer is disposed, the ink composition may then be disposed on the primer disposed on the surface of the first flexible substrate.

In some examples, the primer comprises a primer resin. In some examples, the primer resin may be selected from the group comprising or consisting of hydroxyl containing resins, carboxylic group containing resins, and amine based polymer formulations. In some examples, a hydroxyl containing resin may be selected from polyvinyl alcohol resins, e.g. polyvinyl alcohol based such as polyvinyl butyral formulations (Butvar, Eastman), Vinnol® (Wacker polymers), cellulose derivative additives (Eastman), polyester (Dynapol, Evonic) and polyurethane based formulations with hydroxyl groups. In some examples, the carboxylic group containing resins may be selected from: olefin co-acrylic or methacrylic acid based copolymers, polyacrylic acid based polymers, and polylactic acid based polymers. In some examples, the amine based polymer formulations may be selected from polyamines and polyethylene imines. The primer resin may be selected from the group comprising, or consisting of, a polyvinyl alcohol resin, cellulose based resins, a polyester, a polyamine, a polyethylene imine resin, polyamide resin, polyurethane, copolymers of an alkylene monomer and an acrylic or methacrylic acid monomer, and polyacrylic polymers.

In some examples, the primer resin comprises a carboxylic functional group, an amine functional group or a polyol functional group. In some examples, the primer resin comprises an amine functional group or a carboxylic functional group.

In some examples, the primer resin comprises an amine functional group. In some examples, the primer resin comprises or consists of a polyethylene imine resin. An example of a material suitable as a primer is DP050 (available from Michelman, Inc.).

In some examples, the primer on the surface of the first flexible substrate of the flexible packaging material comprises a crosslinked primer resin.

In some examples, the primer on the surface of the flexible print substrate onto which the ink composition is printed is provided in an amount such that the coat weight of the primer resin on the print substrate is at least 0.01 g/m$^2$, in some examples, at least 0.05 g/m$^2$, in some examples, at least 0.1 g/m$^2$, in some examples, at least 0.15 g/m$^2$, in some examples, at least 0.18 g/m$^2$, in some examples, at least 0.2 g/m², in some examples, at least 0.5 g/m², in some examples, at least 1 g/m², in some examples, at least about 1.5 g/m². In some examples, the primer is provided in an amount such that the coat weight of the primer resin on the print substrate is up to about 0.01 g/m², in some examples, up to about 0.05 g/m², in some examples, up to about 0.1 g/m², in some examples, up to about 0.15 g/m², in some examples, up to about 0.18 g/m², in some examples, up to about 0.2 g/m², in some examples, up to about 0.5 g/m², in some examples, up to about 1 g/m², in some examples, up to about 1.5 g/m². In some examples, the primer is provided in an amount such that the coat weight of the primer resin on the print substrate is 0.01 g/m² to 1.5 g/m², in some examples, 0.05 g/m² to 1 g/m², in some examples, 0.1 g/m² to 0.5 g/m², in some examples, 0.15 g/m² to 0.2 g/m², in some examples, 0.18 g/m² to 0.2 g/m².

In some examples, the first flexible substrate has a primer on the first surface and the ink composition is printed onto the primer on the first surface of the first flexible substrate.

In some examples, the first flexible substrate has a first surface on which a printed image or information is disposed, with a second surface of the first flexible substrate forming the outermost surface of the flexible packaging material. The second surface of the first flexible substrate being a surface other than the surface on which the ink composition is printed, for example, the second surface of the first flexible substrate may be a surface opposing the first surface of the first flexible substrate.

In some examples, the first flexible substrate is printed with an image or information on a first surface of the first flexible substrate. The image or information may be reverse printed onto the first surface of the substrate with a second surface of the first flexible substrate forming the outermost surface of the flexible packaging material and the printed image or information appearing the right way round when viewed through the second surface of the first flexible substrate. In this way, the printed image or information is embedded within the multi-layer structure of the flexible packaging material and not on the outermost surface, and thus protected from damage.

Ink Composition

The ink composition, which may be printed onto a surface of the first flexible substrate, for example, a first surface of the first flexible substrate on which a primer is disposed, may comprise a first thermoplastic resin. References herein to the first thermoplastic resin of the ink composition will be understood as distinguishing this thermoplastic resin from the thermoplastic resin present in the further composition containing the cross-linker. It will however be understood that the ink composition may contain a single thermoplastic resin or a combination of different thermoplastic resins, the combination being referred to herein as the first thermoplastic resin.

In some examples, the ink composition may be a liquid ink composition such as a solvent based or solvent free ink composition used for offset, flexographic or rotogravure technologies, or a powder ink composition such as powder form resins used for toner technology, e.g. dry electrostatic printing. In some examples, the ink composition may be a liquid electrostatic ink composition.

In some examples, the first thermoplastic resin comprises a carboxylic functional group, an amine functional group or a polyol functional group. In some examples, the first thermoplastic resin comprises a carboxylic functional group.

In some examples, the first thermoplastic resin comprises a polymer having acidic side groups. In some examples, the acidic side groups may be in free acid form or may be in the form of an anion and associated with a counterion, generally metal counterions, e.g. a metal selected from the alkali metals, such as lithium, sodium and potassium, alkali earth metals, such as magnesium or calcium, and transition metals, such as zinc. The polymer having acidic side groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitutes from 5 wt. % to about 25 wt. % of the co-polymer, in some examples, from 10 wt. % to about 20 wt. % of the co-polymer.

In some examples, the first thermoplastic resin of the ink composition comprises polyolefin copolymers, polyethylene co-acrylic copolymers, polyethylene co-methacrylic copolymers, polyethylene co-vinyl acetate copolymers, ionomers, or combinations thereof. In some examples, the first thermoplastic resin of the ink composition comprises or consists of alkylene acrylic or methacrylic acid resins, polyurethane resins, polyethylene imine resins, polyamide resin, polyvinyl alcohol and combinations thereof.

The ink composition may be an electrostatic ink composition, for example, a liquid electrophotographic ink composition. In some examples, the ink composition is a liquid electrophotographic (LEP) ink composition comprising a first thermoplastic resin. In some examples, the first thermoplastic resin comprises or consists of a polymer having acidic side groups. In some examples, the electrostatic ink composition comprises a polymer having acid side groups. In some examples, the electrostatic ink composition comprises a first thermoplastic resin comprising a copolymer of an alkylene monomer and a monomer selected from acrylic acid and methacrylic acid.

Electrostatic Ink Composition

Liquid electrophotographic printing, or electrostatic printing, is one method by which images or information can be printed onto substrates such as paper or plastic. The printing processes generally involve creating an image on a photoconductive surface, applying an ink having charged particles to the photoconductive surface, such that they selectively bind to the image, and then transferring the charged particles in the form of the image to a print substrate.

The ink composition printed on the first flexible substrate described herein may be an electrostatic ink composition, for example, a liquid electrophotographic printing composition (also referred to herein as a LEP composition) printed on the first flexible substrate using a liquid electrophotographic printing process, e.g. an LEP printing process. In some examples, the electrostatic ink composition may comprise a colorant or pigment and a thermoplastic resin. An LEP composition may comprise a colorant or pigment, a thermoplastic resin and a carrier fluid or liquid. The LEP composition may further comprise an additive such as a charge director, charge adjuvant, surfactant, viscosity modifier, emulsifier and the like or a combination thereof. In some examples, the LEP composition may not contain any pigment, or may comprise substantially zero pigment and thus be a pigment-free composition, useful in providing a particular transparent gloss or sheen to a printed substrate.

In some examples, after printing, an LEP ink composition, which may be printed on the first flexible substrate, may comprise a reduced amount of carrier liquid compared with the LEP printing composition before printing. In some examples, an electrostatic ink composition, which may be printed on the first flexible substrate, may be substantially free from carrier liquid. Substantially free from carrier liquid may indicate that the ink printed on the print substrate contains less than 5 wt. % carrier liquid, in some examples, less than 2 wt. % carrier liquid, in some examples, less than 1 wt. % carrier liquid, in some examples, less than 0.5 wt. % carrier liquid. In some examples, an electrostatic ink composition that may be printed on the first flexible substrate is free from carrier liquid.

Each of these components of an electrostatic ink composition, which may be the ink composition printed on the first flexible substrate, will be described separately in the subsections which follow.

Colorant

An electrostatic ink composition may comprise a colorant. The colorant may be a dye or pigment. The colorant can be any colorant compatible with the liquid carrier and useful for electrophotographic printing. For example, the colorant may be present as pigment particles, or may comprise a resin (in addition to the polymers described herein) and a pigment. In some examples, the colorant is selected from a cyan pigment, a magenta pigment, a yellow pigment, a white pigment and a black pigment. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples, the white pigment particle may comprise an alumina-$TiO_2$ pigment.

In some examples, the colorant or pigment particles may have a median particle size or $d_{50}$ of less than 20 μm, for example, less than 15 μm, for example, less than 10 μm, for example, less than 5 μm, for example, less than 4 μm, for example, less than 3 μm, for example, less than 2 μm, for example, less than 1 μm, for example, less than 0.9 μm, for example, less than 0.8 μm, for example, less than 0.7 μm, for example, less than 0.6 μm, for example, less than 0.5 μm. Unless otherwise stated, the particle size of the colorant or pigment particle and the resin coated pigment particle is determined by using laser diffraction on a Malvern Mastersizer 2000 according to the standard procedure as described in the operating manual.

The colorant or pigment particle may be present in an electrostatic ink composition in an amount of from 10 wt. % to 80 wt. % of the total amount of resin and pigment, in some examples, 15 wt. % to 80 wt. %, in some examples, 15 wt. % to 60 wt. %, in some examples, 15 wt. % to 50 wt. %, in some examples, 15 wt. % to 40 wt. %, in some examples, 15 wt. % to 30 wt. % of the total amount of resin and colorant. In some examples, the colorant or pigment particle may be present in an electrostatic ink composition in an amount of at least 50 wt. % of the total amount of resin and colorant or pigment, for example, at least 55 wt. % of the total amount of resin and colorant or pigment.

First Thermoplastic Resin

In some examples, the ink composition is an electrostatic ink composition comprising a polymer resin as the first thermoplastic resin. In some examples, the electrostatic ink composition comprises a polymer resin comprising a polymer having acidic side groups. In some examples, an electrostatic ink composition comprises a polymer resin comprising a copolymer of an alkylene monomer and a monomer selected from acrylic acid and methacrylic acid.

The polymer resin or thermoplastic resin may be referred to as a thermoplastic polymer. In some examples, the polymer resin may comprise ethylene or propylene acrylic acid co-polymers; ethylene or propylene methacrylic acid co-polymers; ethylene vinyl acetate co-polymers; co-polymers of ethylene or propylene (e.g. 80 wt. % to 99.9 wt. %), and alkyl (e.g. C1 to C5) ester of methacrylic or acrylic acid (e.g. 0.1 wt. % to 20 wt. %); co-polymers of ethylene (e.g. 80 wt. % to 99.9 wt. %), acrylic or methacrylic acid (e.g. 0.1 wt. % to 20.0 wt. %) and alkyl (e.g. C1 to C5) ester of methacrylic or acrylic acid (e.g. 0.1 wt. % to 20 wt. %); co-polymers of ethylene or propylene (e.g. 70 wt. % to 99.9 wt. %) and maleic anhydride (e.g. 0.1 wt. % to 30 wt. %); polyethylene; polystyrene; isotactic polypropylene (crystalline); co-polymers of ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt. % to 20 wt. %)/ethylhexylacrylate (e.g. 10 wt. % to 50 wt. %)); ethylene-acrylate terpolymers: ethylene-acrylic esters-maleic anhydride (MAH) or glycidyl methacrylate (GMA) terpolymers; ethylene-acrylic acid ionomers or combinations thereof.

The polymer resin may comprise a polymer having acidic side groups. Examples of the polymer having acidic side groups will now be described. The polymer having acidic side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more, in some examples, an acidity of 90 mg KOH/g or more, in some examples, an acidity of 100 mg KOH/g or more, in some examples, an acidity of 105 mg KOH/g or more, in some examples, 110 mg KOH/g or more, in some examples, 115 mg KOH/g or more. The polymer having acidic side groups may have an acidity of 200 mg KOH/g or less, in some examples, 190 mg or less, in some examples, 180 mg or less, in some examples, 130 mg KOH/g or less, in some examples, 120 mg KOH/g or less. Acidity of a polymer, as measured in mg KOH/g can be measured using standard procedures, for example, using the procedure described in ASTM D1386.

The polymer resin may comprise a polymer having acidic side groups, that has a melt flow rate of less than about 70 g/10 minutes, in some examples, about 60 g/10 minutes or less, in some examples, about 50 g/10 minutes or less, in some examples, about 40 g/10 minutes or less, in some examples, 30 g/10 minutes or less, in some examples, 20 g/10 minutes or less, in some examples, 10 g/10 minutes or less. In some examples, all polymers having acidic side groups and/or ester groups in the particles each individually have a melt flow rate of less than 90 g/10 minutes, 80 g/10 minutes or less, in some examples, 70 g/10 minutes or less, in some examples, 60 g/10 minutes or less.

The polymer having acidic side groups can have a melt flow rate of about 10 g/10 minutes to about 120 g/10 minutes, in some examples, about 10 g/10 minutes to about 70 g/10 minutes, in some examples, about 10 g/10 minutes to 40 g/10 minutes, in some examples, 20 g/10 minutes to 30 g/10 minutes. The polymer having acidic side groups can have a melt flow rate of, in some examples, about 50 g/10 minutes to about 120 g/10 minutes, in some examples, 60 g/10 minutes to about 100 g/10 minutes. The melt flow rate can be measured using standard procedures, for example, as described in ASTM D1238.

The acidic side groups may be in free acid form or may be in the form of an anion and associated with a counterion, generally metal counterions, e.g. a metal selected from the alkali metals, such as lithium, sodium and potassium, alkali earth metals, such as magnesium or calcium, and transition metals, such as zinc. The polymer having acidic side groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrlic or methacrylic acid, where the ethylenically unsaturated acid of either acrylic or methacrylic acid constitutes from 5 wt. % to about 25 wt. % of the co-polymer, in some examples, from 10 wt. % to about 20 wt. % of the co-polymer.

The polymer resin may comprise two different polymers having acidic side groups. The two polymers having acidic side groups may have different acidities, which may fall within the ranges mentioned above. The polymer resin may comprise a first polymer having acidic side groups that has an acidity of from 10 mg KOH/g to 110 mg KOH/g, in some examples, 20 mg KOH/g to 110 mg KOH/g, in some examples, 30 mg KOH/g to 110 mg KOH/g, in some examples, 50 mg KOH/g to 110 mg KOH/g, and a second polymer having acidic side groups that has an acidity of 110 mg KOH/g to 130 mg KOH/g.

The polymer resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples, 20 mg KOH/g to 110 mg KOH/g, in some examples, 30 mg KOH/g to 110 mg KOH/g, in some examples, 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples, about 4:1.

The polymer resin may comprise a polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; said polymer may be a polymer having acidic side groups as described herein. The polymer resin may comprise a first polymer having a melt viscosity of 15000 poise or more, in some examples, 20000 poise or more, in some examples, 50000 poise or more, in some examples, 70000 poise or more; and in some examples, the polymer resin may comprise a second polymer having a melt viscosity less than the first polymer, in some examples, a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less. The polymer resin may comprise a first polymer having a melt viscosity of more than 60000 poise, in some examples, from 60000 poise to 100000 poise, in some examples, from 65000 poise to 85000 poise; a second polymer having a melt viscosity of from 15000 poise to 40000 poise, in some examples, 20000 poise to 30000 poise, and a third polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; an example of the first polymer is Nucrel 960 (from DuPont), and example of the second polymer is Nucrel 699 (from DuPont), and an example of the third polymer is AC-5120 or AC-5180 (from Honeywell). The polymer resin may comprise a first polymer having a melt viscosity of from 15000 poise to 40000 poise, in some examples, 20000 poise to 30000 poise, and a second polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; an example of the first polymer is Nucrel 699 (from DuPont), and an example of the second polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the polymer resin comprises a single type of polymer, the polymer (excluding any other components of the electrophotographic ink composition) may have a melt viscosity of 6000 poise or more, in some examples, a melt viscosity of 8000 poise or more, in some examples, a melt viscosity of 10000 poise or more, in some examples, a melt viscosity of 12000 poise or more. If the polymer resin comprises a plurality of polymers all the polymers of the polymer resin may together form a mixture (excluding any other components of the electrophotographic ink composition) that has a melt viscosity of 6000 poise or more, in some examples, a melt viscosity of 8000 poise or more, in some examples, a melt viscosity of 10000 poise or more, in some examples, a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymer resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The polymer resin may comprise (i) a first polymer that is a co-polymer of ethylene and an ethylenically unsaturated acid of either acrylic acid or methacrylic acid, wherein the ethylenically unsaturated acid of either acrylic or methacrylic acid constitutes from 8 wt. % to about 16 wt. % of the co-polymer, in some examples, 10 wt. % to 16 wt. % of the co-polymer; and (ii) a second polymer that is a co-polymer of ethylene and an ethylenically unsaturated acid of either acrylic acid or methacrylic acid, wherein the ethylenically unsaturated acid of either acrylic or methacrylic acid constitutes from 12 wt. % to about 30 wt. % of the co-polymer, in some examples, from 14 wt. % to about 20 wt. % of the co-polymer, in some examples, from 16 wt. % to about 20 wt. % of the co-polymer in some examples, from 17 wt. % to 19 wt. % of the co-polymer.

The polymer resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbon atoms, in some examples, 1 to 20 carbon atoms, in some examples, 1 to 10 carbon atoms; in some examples, selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples, an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples, 5% to 40% by weight, in some examples, 5% to 20% by weight of the co-polymer, in some examples, 5% to 15% by weight of the co-polymer. The second monomer may constitute 1% to 50% by weight of the co-polymer, in some examples, 5% to 40% by weight of the co-polymer, in some examples, 5% to 20% by weight of the co-polymer, in some examples, 5% to 15% by weight of the co-polymer. In some examples, the first monomer constitutes 5% to 40% by weight of the co-polymer and the second monomer constitutes 5% to 40% by weight of the co-polymer, with the third monomer constituting the remaining weight of the co-polymer. In some examples, the first monomer constitutes 5% to 15% by weight of the co-polymer and the second monomer constitutes 5% to 15% by weight of the co-polymer, with the third monomer constituting the remaining weight of the co-polymer. In some examples, the first monomer constitutes 8% to 12% by weight of the co-polymer and the second monomer constitutes 8% to 12% by weight of the co-polymer, with the third monomer constituting the remaining weight of the co-polymer. In some examples, the first monomer constitutes about 10% by weight of the co-polymer and the second monomer constitutes about 10% by weight of the co-polymer, with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. first thermoplastic resin polymers, in the liquid electrophotographic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples, 8% or more by weight of the total amount of the resin polymers, e.g. thermoplastic resin polymers, in some examples, 10% or more by weight of the total amount of the resin polymers, e.g. thermoplastic resin polymers, in some examples, 15% or more by weight of the total amount of the resin polymers, e.g. thermoplastic resin polymers, in some examples, 20% or more by weight of the total amount of the resin polymers, e.g. thermoplastic resin polymers, in some examples, 25% or more by weight of the total amount of the resin polymers, e.g. thermoplastic resin polymers, in some examples, 30% or more by weight of the total amount of the resin polymers, e.g. thermoplastic resin polymers, in some examples, 35% or more by weight of the total amount of the resin polymers, e.g. thermoplastic resin polymers, in the liquid electrophotographic composition and/or the ink printed on the print substrate. The polymer having ester side groups may constitute from 5% to 50% by weight of the total amount of the resin polymers, e.g. thermoplastic resin polymers, in the liquid electrophotographic composition and/or the ink printed on the print substrate, in some examples, 10% to 40% by weight of the total amount of the resin polymers, e.g. thermoplastic resin polymers, in the liquid electrophotographic composition and/or the ink composition printed on the print substrate, in some examples, 5% to 30% by weight of the total amount of the resin polymers, e.g. thermoplastic resin polymers, in the liquid electrophotographic composition and/or the ink composition printed on the print substrate, in some examples, 5% to 15% by weight of the total amount of the resin polymers, e.g. thermoplastic resin polymers, in the liquid electrophotographic composition and/or the ink composition printed on the print substrate, in some examples, 15% to 30% by weight of the total amount of the resin polymers, e.g. thermoplastic resin polymers, in the liquid electrophotographic composition and/or the ink composition printed on the print substrate.

The polymer having ester side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more. The polymer having ester side groups may have an acidity of 100 mg KOH/g or less, in some examples, 90 mg KOH/g or less. The polymer having ester side groups may have an acidity of 60 mg KOH/g to 90 mg KOH/g, in some examples, 70 mg KOH/g to 80 mg KOH/g.

The polymer having ester side groups may have a melt flow rate of about 10 g/10 minutes to about 120 g/10 minutes, in some examples, about 10 g/10 minutes to about 50 g/10 minutes, in some examples, about 20 g/10 minutes to about 40 g/10 minutes, in some examples, about 25 g/10 minutes to about 35 g/10 minutes.

The polymer, polymers, co-polymer or co-polymers of the thermoplastic resin can, in some examples, be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the AC family of toners (e.g. AC-5120, AC-5180, AC-540, AC-580 (sold by Honeywell)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The polymer resin can constitute about 5% to 90%, in some examples, about 50% to 80%, by weight of the solids of the liquid electrophotographic composition and/or the ink composition printed on the print substrate. The resin can constitute about 60% to 95%, in some examples, about 70% to 95%, by weight of the solids of the liquid electrophotographic composition and/or the ink composition printed on the print substrate.

Carrier Liquid

In some examples, an electrostatic ink composition described herein comprises polymer resin coated pigment particles, or polymer resin particles, which are formed in and/or dispersed in a carrier fluid or carrier liquid. Before application to the print substrate, e.g. the first flexible substrate, in a printing process, e.g. an electrostatic printing process, the ink composition may be an electrostatic ink composition, which may be in dry form, for example, in the form of flowable pigment particles coated with the thermoplastic resin. In some examples, before application to the print substrate in an electrostatic printing process, an electrostatic ink composition may be in liquid form; and may comprise a carrier liquid in which is suspended pigment particles coated with the thermoplastic resin.

Generally, the carrier liquid acts as a reaction solvent in preparing the coated pigment particles, and can also act as a dispersing medium for the other components in the resulting electrostatic ink composition. In some examples, the carrier liquid is a liquid which does not dissolve the polymer resin at room temperature. In some examples, the carrier liquid is a liquid which dissolves the polymer resin at elevated temperatures. For example, the polymer resin may be soluble in the carrier liquid when heated to a temperature of at least 80° C., for example, 90° C., for example, 100° C., for example, 110° C., for example, 120° C. For example, the carrier liquid can comprise or be a hydrocarbon, silicone oil, vegetable oil, etc. The carrier liquid can include, an insulating, non-polar, non-aqueous liquid that can be used as a medium for toner particles. The carrier liquid can include compounds that have a resistivity in excess of about $10^9$ ohm·cm. The carrier liquid may have a dielectric constant below about 5, in some examples, below about 3. The carrier liquid can include hydrocarbons. The hydrocarbon can include an aliphatic hydrocarbon, an isomerized aliphatic hydrocarbon, branched chain aliphatic hydrocarbons, aromatic hydrocarbons, and combinations thereof. Examples of the carrier liquids include aliphatic hydrocarbons, isoparaffinic compounds, paraffinic compounds, dearomatized hydrocarbon compounds, and the like. In particular, the carrier liquids can include Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of an electrostatic ink composition, in some examples, 50% to 99.5% by weight of an electrostatic ink composition. Before printing, the carrier liquid may constitute about 40% to 90% by weight of an electrostatic ink composition. Before printing, the carrier liquid may constitute about 60% to 80% by weight of an electrostatic ink composition. Before printing, the carrier liquid may constitute about 90% to 99.5% by weight of an electrostatic ink composition, in some examples, 95% to 99% by weight of an electrostatic ink composition.

An electrostatic ink composition, when printed on a print substrate, e.g. the first flexible substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt. % carrier liquid, in some examples, less than 2 wt. % carrier liquid, in some examples, less than 1 wt. % carrier liquid, in some examples, less than 0.5 wt. % carrier liquid. In some examples, the ink printed on a print substrate, e.g. the first flexible substrate, is free from carrier liquid.

Charge Director and Charge Adjuvant

A liquid electrophotographic composition and/or the ink composition printed on the print substrate can comprise a charge director. A charge director can be added to an electrostatic composition to impart a charge of a desired polarity and/or maintain sufficient electrostatic charge on the particles of an electrostatic ink composition. The charge director may comprise ionic compounds, including, for example, metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula: $[R_a—O—C(O)CH_2CH(SO_3^-)C(O)—O—R_b]$, where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a—O—C(O)CH_2CH(SO_3^-)C(O)—O—R_b]$, where each of $R_a$ and $R_b$ is an alkyl group, or other charge directors as found in WO2007130069, which is incorporated herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples, 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{3+}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf$, $F^-$, $ClO_4^-$, and $TiO_3^{4-}$, or from any subgroup thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a—O—C(O)CH_2CH(SO_3^-)C(O)—O—R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_n$ may be as defined in any part of WO2007130069.

The charge director may comprise (i) soya lecithin, (ii) a barium sulfonate salt, such as basic barium petronate (BBP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic ink composition, the charge director can constitute about 0.001% to 20%, in some examples, 0.01% to 20% by weight, in some examples, 0.01% to 10% by weight, in some examples, 0.01% to 1% by weight of the solids of an electrostatic ink composition and/or ink composition printed on the print substrate. The charge director can constitute about 0.001% to 0.15% by weight of the solids of a liquid electrophotographic ink composition and/or ink composition printed on the print substrate, in some examples, 0.001% to 0.15%, in some examples, 0.001% to 0.02% by weight of the solids of a liquid electrophotographic ink composition and/or ink composition printed on the print substrate. In some examples, a charge director imparts a negative charge on an electrostatic ink composition. The particle conductivity may range from 50 to 500 pmho/cm, in some examples, from 200-350 pmho/cm.

A liquid electrophotographic ink composition and/or ink composition printed on the print substrate can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, for example, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di- and/or tristearate and/or aluminium di- and/or tripalmitate.

The charge adjuvant can constitute about 0.1% to 5% by weight of the solids of a liquid electrophotographic ink composition and/or ink composition printed on the print substrate. The charge adjuvant can constitute about 0.5% to 4% by weight of the solids of a liquid electrophotographic ink composition and/or ink composition printed on the print substrate. The charge adjuvant can constitute about 1% to 3% by weight of the solids of a liquid electrophotographic ink composition and/or ink composition printed on the print substrate.

Other Additives

In some examples, an electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Further Composition

The further composition may comprise a cross-linker, a white pigment and a second thermoplastic resin.

In some examples, the further composition may additionally comprise a plasticiser. In some examples, the plasticiser may be a polyfunctional amine. In some examples, the plasticiser may constitute 0.01 wt. % to 3 wt. % of the total weight of the further composition, in some examples, 0.05 wt. % to 2.5 wt. %, in some examples, 0.1 wt. % to 2 wt. %, in some examples, 0.5 wt. % to 1.5 wt. %, in some examples, 0.04 wt. % to 1 wt. % of the total weight of the further composition.

In some examples, the further composition comprises any commercially available white printing ink, to which a cross-linker has been added. For example, the further composition may comprise a white printing ink and further comprises a cross-linker.

In some examples, the cross-linker may be for crosslinking the first thermoplastic resin, that is, the thermoplastic resin of the ink composition. Depositing the further composition comprising a cross-linker onto the printed ink composition, e.g. printed ink layer, disposed on the first flexible substrate may crosslink the thermoplastic resin of the ink composition. Crosslinking the thermoplastic resin may increase cohesion in the printed ink composition disposed on the first flexible substrate. Crosslinking the thermoplastic resin may improve the physical properties of a printed substrate (such as a printed ink layer disposed on the first flexible substrate), for example, the water, chemical and thermal resistance, as well as the ink-substrate interaction and thus the ink adhesion to the substrate.

In some examples, the cross-linker of the further composition penetrates the ink composition on the surface of the first flexible substrate whilst the white pigment and the second thermoplastic resin remain on the surface of the ink composition forming a white layer on the printed ink composition.

In some examples, the cross-linker may be a cross-linker for crosslinking the first thermoplastic resin and a cross-linker for crosslinking the primer resin of a primer. In some examples, the cross-linker may crosslink the thermoplastic resin within the ink composition, crosslink the primer resin within the primer and crosslink the thermoplastic resin of the ink composition with the primer resin of the primer.

In some examples, a further composition comprising a cross-linker may be deposited onto the printed ink composition, e.g. printed ink layer, disposed on a primer comprising a primer resin on a surface of the print substrate. Deposition of the further composition comprising a cross-linker onto the printed ink composition, e.g. printed ink layer, on the primed first flexible substrate may crosslink the thermoplastic resin of the ink composition and crosslink the primer resin of the primer. Crosslinking the thermoplastic resin of the ink composition may increase cohesion in the printed ink composition disposed on the print substrate. Crosslinking the thermoplastic resin of the ink composition may improve the physical properties of a printed substrate (such as a printed ink layer disposed on a primer disposed on the first flexible substrate), for example, the water, chemical and thermal resistance, as well as the ink-primer-substrate interaction and thus the ink adhesion to the substrate. Crosslinking the primer resin of the primer may increase cohesion within the primer and/or improve chemical resistance and water resistance of the primer. Crosslinking the primer resin may also limit mobility of the ink composition disposed on the primer layer. Crosslinking between the primer resin and the first thermoplastic resin may improve binding between the primer and the ink composition, reduce the mobility of the ink composition and/or the primer, and/or improve the physical properties of the ink composition. Crosslinking of the primer resin of the primer, crosslinking of the thermoplastic resin of the ink composition and/or crosslinking of the primer resin of the primer to the thermoplastic resin of the ink composition may improve the mechanical durability and chemical resistance of the printed flexible packaging material.

In some examples, the cross-linker may be any cross-linker suitable to crosslink the thermoplastic resin of the ink composition and to crosslink the primer resin of the primer.

In some examples, the cross-linker may crosslink the thermoplastic resin within the ink composition, crosslink the thermoplastic resin of the ink composition with the primer resin of the primer and crosslink the primer resin within the primer.

In some examples, the further composition comprises a cross-linker which is reactive towards a carboxylic functional group, an amine functional group, a polyol functional group, or a combination thereof.

In some examples, the further composition comprises a cross-linker which is reactive towards a carboxylic functional group and/or an amine functional group.

In some examples, the cross-linker may cross-link the thermoplastic resin within the ink composition and cross-link the primer resin within the primer.

In some examples, the cross-linker may cross-link the thermoplastic resin within the ink composition, cross-link the thermoplastic resin of the ink composition with the primer resin of the primer and cross-link the primer resin within the primer.

For example, when the first thermoplastic resin and/or the primer resin comprises a carboxylic functional group, the cross-linker may comprise an epoxide, an aziridine, an organic metallic complex or ion, an organosilane, an epoxy organosilane, a carbodiimide, an isocyanate or an acetyl acetonate.

For example, when the first thermoplastic resin and/or the primer resin comprises an amine functional group, the cross-linker may comprise an epoxide, an aziridine, an isocyanate, a maleic anhydride, an isocyanate alkyl organosilane, an epoxy organosilane, a carbodiimide, an aldehyde, a ketone, an acetyl acetonate, an isothiocyanate, an acyl azide, an NHS ester, a sulfonyl chloride glyoxal, a carbonate, an aryl halide or an imidoester.

In some examples, when the first thermoplastic resin comprises a polymer having acid side groups and the primer resin comprises an amine functional group (e.g. polyethylene imine), the cross-linker may be selected from an epoxy-based cross-linker, an aziridine-based cross-linker, an isocyanate-based cross-linker or a carbodiimide-based cross-linker. In some examples, when the first thermoplastic resin comprises a polymer having acid side groups and the primer resin comprises an amine functional group (e.g. polyethylene imine), the cross-linker may be an epoxy-based cross-linker.

In some examples, the further composition comprises a cross-linker selected from an epoxide, an aziridine, an isocyanate, a maleic anhydride, an organic metallic complex or ion, an organsilane, an epoxy organosilane, a carbodiimide, an aldehyde, a ketone, an acetyl acetonate or combinations thereof. For example, the further composition may comprise an epoxide, an aziridine, an isocyanate, a maleic anhydride, an organic metallic complex or ion, an organosilane, an epoxy organosilane, a carbodiimide, an aldehyde, a ketone, an acetyl acetonate or combinations thereof.

In some examples, the further composition comprises a cross-linker selected from an epoxide, an aziridine, an isocyanate and a carbodiimide. For example, the further composition may comprise an epoxide, an aziridine, an isocyanate, or a carbodiimide.

In some examples, the further composition comprises a cross-linker selected from an epoxide, an aziridine, and a carbodiimide. For example, the further composition may comprise an epoxide, an aziridine, or a carbodiimide.

In some examples, the further composition comprises an epoxide as the cross-linker.

In some examples, the further composition comprises a cross-linker in an amount greater than about 0.01 wt. % by total weight of the further composition, in some examples, greater than about 0.1 wt. %, in some examples, greater than about 0.5 wt. %, in some examples, greater than about 1 wt. %, in some examples, greater than about 1.5 wt. %, in some examples, greater than about 2 wt. %, in some examples, greater than about 2.5 wt. %, in some examples, greater than about 3 wt. %, in some examples, about 4 wt. % or greater, in some examples, about 5 wt. % or greater, in some examples, about 5 wt. %.

In some examples, the further composition comprises a cross-linker in an amount up to about 20 wt. % by total weight of the further composition, in some examples, up to about 15 wt. %, in some examples, up to about 10 wt. %.

In some examples, the further composition comprises a cross-linker in an amount within the range of about 0.5 wt. % to about 10 wt. % by total weight of the further composition.

In some examples, the further composition may comprise a photo-initiator.

The cross-linker may comprise a group selected from epoxy, aziridine, isocyanate, maleic anhydride, anhydride, organosilane, epoxy oganosilane, carbodiimide, aldehyde, ketone, acetyl acetonate, organic metallic complexes or ions, or a combination thereof.

In some examples, cross-linker may be an epoxy-based cross-linker, aziridine-based cross-linker, isocyanate-based cross-linker, maleic anhydride-based cross-linker, anhydride-based cross-linker, organosilane-based cross-linker, epoxy oganosilane-based cross-linker, carbodiimide-based cross-linker, aldehyde-based cross-linker, ketone-based cross-linker, or acetyl acetonate-based cross-linker as described below.

In some examples, the cross-linker has a molecular weight of more than 5000 Daltons. In some examples, the cross-linker has a molecular weight of 5000 Daltons or less, in some examples, 4000 Daltons or less, in some examples, 3000 Daltons or less, in some examples, 1500 Daltons or less, in some examples, a molecular weight of 1000 Daltons or less, in some examples, a molecular weight of 700 Daltons or less, in some examples, a molecular weight of 600 Daltons or less. In some examples, the cross-linker has a molecular weight of from 100 to 1500 Daltons, in some examples, a molecular weight of from 100 to 600 Daltons.

In some examples, the cross-linker comprises a group selected from epoxy, aziridine, isocyanate or carbodiimide.

In some examples, the cross-linker comprises a polyepoxide, a polyaziridine, a polyisocyanate or a polycarbodiimide.

In some examples, the cross-linker is an epoxy-based cross-linker, for example, a polyepoxide. The term 'polyepoxide' is used herein to refer to a molecule comprising at least two epoxy groups, e.g. of the formula —CH(O)CR$^1$H, wherein R$^1$ is selected from H and alkyl, in some examples, wherein R$^1$ is H.

In some examples, the epoxy-based cross-linker is of the formula (I):

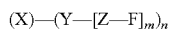

wherein, in each (Y—[Z—F]$_m$), Y, Z and F are each independently selected, such that
F is an epoxy group, e.g. of the formula —CH(O)CR$^1$H, wherein R$^1$ is selected from H and alkyl;
Z is alkylene,
Y is selected from (i) a single bond, —O—, —C(=O)—O—, and —O—C(=O)— wherein m is 1 or (ii) Y is NH$_{2-m}$ wherein m is 1 or 2,
n is at least 1, in some examples, at least 2, in some examples, 2-4,
and X is an organic group.

In some examples, the cross-linker of formula (I) has at least two F groups.

In some examples, F is an epoxide of the formula —CH(O)CR$^1$H in which R$^1$ is H.

X may comprise or be an organic group selected from optionally substituted alkylene, optionally substituted alkyl, optionally substituted aryl, optionally substituted arylalkyl, optionally substituted alkylaryl, isocyanurate, and polysiloxane. X may comprise a polymeric component; in some examples, the polymeric component may be selected from a polysilane, a polysiloxane (such as poly(dimethyl siloxane), a polyalkylene (such as polyethylene or polypropylene), a poly acrylate (such as polymethyl acrylate) and a poly (alkylene glycol) (such as poly(ethylene glycol) and poly(propylene glycol)), and combinations thereof. In some examples, X comprises a polymeric backbone, comprising a plurality of repeating units, each of which is covalently bonded to (Y—[Z—F]$_m$), with Y, Z, F and m as described herein. X may be a group selected from a branched or straight-chain C$_{1-5}$ alkyl (e.g. methyl), phenyl, methylene bisphenyl, triphenylmethane, cyclohexane, isocyanurate.

In some examples, Y is selected from a single bond, —O—, —C(=O)—O—, and —O—C(=O)—, m is 1, and X is an organic group selected from alkylene (e.g. C$_{1-6}$ alkylene), optionally substituted alkylene (e.g. C$_{1-6}$ alkylene), aryl (e.g. C$_{5-12}$ aryl), optionally substituted aryl (e.g. C$_{5-12}$ aryl), arylalkyl (e.g. C$_{6-20}$ arylalkyl), optionally substituted arylalkyl (e.g. C$_{6-20}$ arylalkyl), alkylaryl (e.g. C$_{6-20}$ alkylaryl) and optionally substituted alkylaryl (e.g. C$_{6-20}$ alkylaryl). In some examples, Y is selected from a single bond, —O—, —C(=O)—O—, and —O—C(=O)—, m is 1, and X is an organic group selected from alkylene, aryl, arylalkyl, and alkylaryl. In some examples, Y is selected from a single bond, —O—, —C(=O)—O—, and —O—C(=O)—, m is 1, and X is an organic group selected from C$_{1-6}$ alkylene, C$_{5-12}$ aryl, C$_{6-20}$ arylalkyl, and C$_{6-20}$ alkylaryl. In some examples, Y is selected from a single bond, —O—, —C(=O)—O—, and —O—C(=O)—, m is 1, and X is an organic group selected from C$_{1-6}$ alkylene (e.g. methylene), phenyl, methylene bisphenyl, triphenylmethane, cyclohexane.

In some examples, X is selected from (i) an alkane, which may be an optionally substituted straight chain, branched or cyclo-alkane, (ii) a cyclo alkane having at least two substituents that are Y—[Z—F]$_m$ and (iii) an aryl (such as phenyl). In some examples, X is selected from (i) a branched alkane, with at least at least two of the alkyl branches covalently bonded to (Y—[Z—F]$_m$) and (ii) a cyclo alkane having at least two substituents that are Y—[Z—F]$_m$ and (iii) an aryl (such as phenyl) having at least two substituents that are Y—[Z—F]$_m$; Y is selected from (i) —O—, —C(=O)—O—, and —O—C(=O)— and m is 1 or (ii) Y is —NH$_{2-m}$, wherein m is 1 or 2; Z is C$_{1-4}$ alkylene; F is an epoxide of the formula —CH(O)CR$^1$H, wherein R$^1$ is selected from H and methyl, and in some examples, F is an epoxide of the formula —CH(O)CR$^1$H in which R$^1$ is H.

In some examples, Z—F is an epoxycycloalkyl group. In some examples, Z—F is an epoxycyclohexyl group. In some examples, Z—F is an epoxycyclohexyl group, in some examples, a 3,4-epoxycyclohexyl group. In some examples, the cross-linker comprises two epoxycycloalkyl groups, in some examples, two epoxycyclohexyl groups.

In some examples, the cross-linker comprises two epoxycycloalkyl groups, which are bonded to one another via a linker species; and the linker species may be selected from a single bond, optionally substituted alkyl, optionally substituted aryl, optionally substituted arylalkyl, optionally substituted alkylaryl, isocyanurate, a polysiloxane, —O—, —C(=O)—O—, —O—C(=O)—, and amino and combinations thereof. In some examples, the linker species may be selected from alkylene, —O—, —C(=O)—O— and —O—C(=O)—. In some examples, the linker species may be selected from —C(=O)—O— and —O—C(=O)—.

In some examples, the epoxy-based cross-linker is selected from the DECH family of epoxy-based cross-linkers (including 3,4-epoxycyclohexylmethyl 3,4-epoxycyclohexanecarboxylate and 7-oxabicyclo[4.1.0]hept-3-ylmethyl 7-oxabicyclo[4.1.0]heptane-3-carboxylate) and tris(4-hydroxyphenyl)methane triglycidyl ether. In some examples, the epoxy-based cross-linker is selected from 3,4-epoxycyclohexylmethyl 3,4-epoxycyclohexanecarboxylate and 7-oxabicyclo[4.1.0]hept-3-ylmethyl 7-oxabicyclo[4.1.0]heptane-3-carboxylate, in some examples, 7-oxabicyclo[4.1.0]hept-3-ylmethyl 7-oxabicyclo[4.1.0]heptane-3-carboxylate.

In some examples, the cross-linker is an aziridine-based cross-linker, for example, a polyaziridine. The term 'polyaziridine' is used herein to refer to a molecule comprising at least two aziridine groups, e.g. of the formula —N(CH$_2$CR$^2$H), wherein R$^2$ is selected from H and alkyl (e.g. methyl), in some examples, wherein R$^2$ is methyl.

In some examples, the aziridine-based cross-linker is of the formula (II).

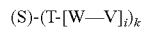

wherein, in each (T-[W—V]$_i$), T, W and V are each independently selected, such that V is an aziridine group, e.g. of the formula —N(CH$_2$CR$^2$H), wherein R$^2$ is selected from H and alkyl;

W is alkylene,

T is selected from (i) a single bond, —O—, —C(=O)—O—, and —O—C(=O)— and i is 1 or (ii) T is NH$_{2-i}$, wherein i is 1 or 2, k is at least 1, in some examples, at least 2, in some examples, at least 3, in some examples, 1-4, in some examples, 2-4, and S is an organic group.

In some examples, the cross-linker of formula (II) has at least two V groups, in some examples, at least three V groups.

In some examples, V is an aziridine of the formula —N(CH$_2$CR$^2$H) in which R$^2$ is alkyl, in some examples, R$^2$ is methyl.

S may comprise or be an organic group selected from optionally substituted alkylene, optionally substituted alkyl, optionally substituted aryl, optionally substituted arylalkyl, optionally substituted alkylaryl, isocyanurate, and a polysiloxane. S may comprise a polymeric component; in some examples, the polymeric components may be selected from a polysiloxane (such as poly(dimethyl siloxane), a polyalkylene (such as polyethylene or polypropylene), an acrylate (such as methyl acrylate) and a poly(alkylene glycol) (such as poly(ethylene glycol) and poly(propylene glycol)), and combinations thereof. In some examples, S comprises a polymeric backbone, comprising a plurality of repeating units, each of which is covalently bonded to (T-[W—V]$_i$), with T, W, V and i as described herein. S may be selected from a group selected from a branched or straight-chain C$_{1-12}$ alkyl (e.g. C$_{1-6}$).

In some examples, S is a branched-chain alkyl (e.g. trimethyl propane) in which each of the alkyl branch groups (e.g. each of the methyl groups when S is trimethyl propane) are substituted with a (T-[W—V]$_i$) group (i.e. k is 3 when S is trimethyl propane), in which T is selected from —O—, —C(=O)—O—, and —O—C(=O)—, in some examples, —O—C(=O)—; i is 1; W is C$_{1-4}$ alkylene, in some examples, methylene (—CH$_2$—) or ethylene (—CH$_2$—CH$_2$—), in some examples, ethylene; and V is an aziridine group of the formula —N(CH$_2$CR$^2$H) in which R$^2$ is alkyl, in some examples, methyl.

In some examples, the aziridine-based cross-linker is trimethylolpropane tris(2-methyl-1-azridinepropionate) (XAMA®-2).

In some examples, the cross-linker is an isocyanate-based cross-linker, for example, a polyisocyanate. The term 'polyisocyanate' is used herein to refer to a molecule comprising at least two isocyanate groups, e.g. of the formula —NCO.

In some examples, the isocyanate based cross-linker is selected from polymethylene diphenyl isocyanates, biuret, hexamethylene diisocyanate trimer (trimer of HDI), uretdion dimer (Alipa), blocked isocyanates (Cytec, Bayer, Alipa) and aliphatic polyisocyanates.

In some examples, the isocyanate based cross-linker is selected from polymethylene diphenyl isocyanates (e.g. Papi27 (Dow), Desmodur44V20 (Bayer), Suprasec5024 (Huntsman)), biuret, hexamethylene diisocyanate trimer (trimer of HDI), uretdion dimer (Alipa), blocked isocyanates (Cytec, Bayer, Alipa), aliphatic polyisocyanates, tolylene diisocyanate, diphenylmethane diisocyanate, naphthalene diisocyanate, xylylene diisocyanate, hydrogenated xylylene diisocyanate, hexamethylene diisocyanate, trimethylhexamethylene diisocyanate, isophorone diisocyanate, methylene-bis(4-cyclohexyl isocyanate),

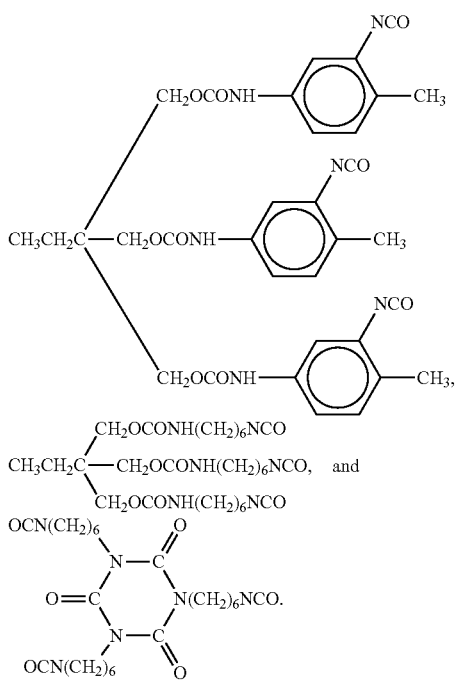

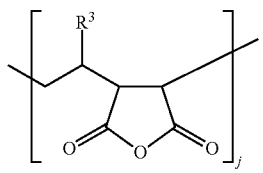

In some examples, the cross-linker is a carbodiimide-based cross-linker, for example, a polycarbodiimide. The term 'polycarbodiimide' is used herein to refer to a molecule comprising at least two carbodiimide groups, e.g. of the formula —NCN—.

In some examples, the carbodiimide based cross-linker is SV-02 Carbodilite.

In some examples, the cross-linker is selected from organic metallic complexes or ions, for examples, ionomers and $Zn^{2+}$, $Ca^{2+}$ containing compounds.

In some examples, the cross-linker comprises a maleic anhydride, e.g. the cross-linker may be a maleic anhydride-based cross-linker. In some examples, the cross-linker is a polymaleic anhydride.

In some examples, the maleic anhydride-based cross-linker is of formula (III),

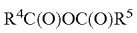

where $R^3$ is H or alkyl and j is greater than 1.

In some examples, j is greater than 10, in some examples, greater than 100.

In some examples, $R^3$ is H or $C_{1-20}$ alkyl (e.g. $C_{1-6}$ alkyl).

In some examples, the maleic anhydride-based cross-linker is polymaleic anhydride 1-octadecene (available from Polyscience) or poly(ethylene-alt-maleic anhydride) (available from Sigma).

In some examples, the cross-linker may comprise an anhydride. In some examples, the cross-linker is an anhydride based cross-linker, e.g. a cross-linker comprising the group —C(O)OC(O)—.

In some examples, the anhydride based cross-linker is a cyclic anhydride, in some examples, a cyclic anhydride of formula (IV)

$R^4C(O)OC(O)R^5$ where $R^4$ and $R^5$ are linked to form an optionally substituted ring.

In some examples, the anhydride based cross-linker is glutaric anhydride or phthalic anhydride.

In some examples, the cross-linker comprises a polyanhydride, for example, polyacrylic anhydride or polymethacrylic anhydride.

In some examples, the cross-linker comprises an aldehyde. In some examples, the cross-linker is an aldehyde-based cross-linker, for example, a polyaldehyde. The term 'polyaldehyde' is used herein to refer to a molecule comprising at least two aldehyde groups, e.g. of the formula —C(O)H.

In some examples, the cross-linker comprises a ketone. In some examples, the cross-linker is a ketone-based cross-linker, for example, a polyketone. The term 'polyketone' is used herein to refer to a molecule comprising at least two ketone groups.

In some examples, the cross-linker comprises an acetyl acetonate. In some examples, the cross-linker is an acetyl acetonate based cross-linker, for example, acetoacetoxyethyl methacrylate (Eastman™ AAEM).

In some examples, the cross-linker comprises an organosilane, for example, a cross-linker comprising a silane group. In some examples, the organosilane may be of the formula R'Si($R^6$)($R^7$)($R^8$) wherein $R^6$, $R^7$ and $R^8$ are independently selected from optionally substituted alkoxy, optionally substituted alkyl and optionally substituted aryl; and R' is selected from optionally substituted alkoxy, optionally substituted alkyl (e.g. aminoalkyl) and optionally substituted aryl. In some examples, $R^6$, $R^7$ and $R^8$ are all alkyl, e.g. methyl. In some examples, R' is optionally substituted alkyl, e.g. amino substituted alkyl (e.g. $C_{1-12}$ aminoalkyl), or isocyanate substituted alkyl. In some examples, R' is $C_{1-6}$ aminoalkyl (e.g. aminopropyl).

In some examples, the cross-linker comprises trimethylaminopropylsilane.

In some examples, the cross-linker comprises an epoxyorganosilane, for example, a cross-linker comprising a silane group (e.g. a group of formula —Si($R^6$)($R^7$)($R^8$) as described above) and an epoxy group as described above.

In some examples, the cross-linker comprises an epoxyorganosilane selected from epoxypropyltrimethoxysilane and oligomeric polyepoxysilane.

White Pigment

In some examples, the further composition comprises a white pigment.

In some examples, the white pigment is selected from the group consisting of $TiO_2$, calcium carbonate, zinc oxide, alumina-$TiO_2$, barium sulphate and mixtures thereof.

In some examples, the further composition comprises 1 wt. % or more white pigment. References herein to the wt. % of white pigment in the further composition are to the weight of the pigment based on the total weight of the composition, including solvents.

In some examples, the further composition comprises 1 wt. % or more white pigment, in some examples, 2 wt. % or more white pigment, in some examples, 3 wt. % or more white pigment, in some examples, 4 wt. % or more white pigment, in some examples, 5 wt. % or more white pigment, in some examples, 6 wt. % or more white pigment, in some examples, 7 wt. % or more white pigment, in some examples, 8 wt. % or more white pigment, in some examples, 9 wt. % or more white pigment, in some examples, 10 wt. % or more white pigment, in some examples, 11 wt. % or more white pigment, in some examples, 12 wt. % or more white pigment, in some examples, 13 wt. % or more white pigment, in some examples, 14 wt. % or more white pigment, in some examples, 15 wt. % or more white pigment, in some examples, 16 wt. % or more white pigment, in some examples, 17 wt. % or more white pigment, in some examples, 18 wt. % or more white pigment, in some examples, 19 wt. % or more white pigment, in some examples, 20 wt. % or more white pigment, in some examples, 21 wt. % or more white pigment, in some examples, 22 wt. % or more white pigment, in some examples, 23 wt. % or more white pigment, in some examples, 24 wt. % or more white pigment, in some examples, 25 wt. % or more white pigment, 26 wt. % or more white pigment, in some examples, 27 wt. % or more white pigment, in some examples, 28 wt. % or more white pigment, in some examples, 29 wt. % or more white pigment, in some examples, 30 wt. % or more white pigment, in some examples, 31 wt. % or more white pigment, in some examples, 32 wt. % or more white pigment, in some examples, 33 wt. % or more white pigment, in some examples, 34 wt. % or more white pigment, in some examples, 35 wt. % or more white pigment. In some examples, the further composition comprises 35 wt. % or less white pigment, in some examples, 34 wt. % or less white pigment, in some examples, 33 wt. % or less white pigment, in some examples, 32 wt. % or less white pigment, in some examples, 31 wt. % or less white pigment, in some examples, 30 wt. % or less white pigment, in some examples, 29 wt. % or less white pigment, in some examples, 28 wt. % or less white pigment, in some examples, 27 wt. % or less white pigment, in some examples, 26 wt. % or less white pigment, in some examples, 25 wt. % or less white pigment, in some examples, 24 wt. % or less white pigment, in some examples, 23 wt. % or less white pigment, in some examples, 22 wt. % or less white pigment, in some examples, 21 wt. % or less white pigment, in some examples, 20 wt. % or less white pigment, in some examples, 19 wt. % or less white pigment, in some examples, 18 wt. % or less white pigment, in some examples, 17 wt. % or less white pigment, in some examples, 16 wt. % or less white pigment, in some examples, 15 wt. % or less white pigment, in some examples, 14 wt. % or less white pigment, in some examples, 13 wt. % or less white pigment, in some examples, 12 wt. % or less white pigment, in some examples, 11 wt. % or less white pigment, in some examples, 10 wt. % or less white pigment, in some examples, 9 wt. % or less white pigment, in some examples, 8 wt. % or less white pigment, in some examples, 7 wt. % or less white pigment, in some examples, 6 wt. % or less white pigment, in some examples, 5 wt. % or less white pigment, in some examples, 4 wt. % or less white pigment, in some examples, 3 wt. % or less white pigment, in some examples, 2 wt. % or less white pigment, in some examples, 1 wt. % or less white pigment. In some examples, the further composition comprises 1 wt. % to 35 wt. % white pigment, in some examples, 2 wt. % to 34 wt. % white pigment, in some examples, 3 wt. % to 33 wt. % white pigment, in some examples, 4 wt. % to 32 wt. %, in some examples, 5 wt. % to 31 wt. %, in some examples, 6 wt. % to 30 wt. %, in some examples, 7 wt. % to 29 wt. %, in some examples, 8 wt. % to 28 wt. %, in some examples, 9 wt. % to 27 wt. %, in some examples, 10 wt. % to 26 wt. %, in some examples, 11 wt. % to 25 wt. %, in some examples, 12 wt. % to 24 wt. %, in some examples, 13 wt. % to 23 wt. % white pigment, in some examples, 14 wt. % to 22 wt. % white pigment, in some examples, 15 wt. % to 21 wt. % white pigment, in some examples, 16 wt. % to 20 wt. % white pigment, in some examples, 17 wt. % to 19 wt. % white pigment, in some examples, 3 wt. % to 18 wt. % white pigment.

Second Thermoplastic Resin

In some examples, the second thermoplastic resin comprises a polymer resin. The second thermoplastic resin may comprise any thermoplastic resin suitable for use in standard deposition techniques. In some examples, the second thermoplastic resin is absent groups that can form a bond with the cross-linker.

In some examples, the second thermoplastic resin may be selected from the group comprising or consisting of acrylic resins, styrene acrylic resins, carboxylated acrylic resins, polyurethane resins, polyester resins, polyacetate resins, polyvinyl resins, polyvinyl pyrrolidone resins, polyvinylidene resins, nitrocellulose resins, polyamide resins, copolymers thereof and mixtures thereof.

In some examples, the second thermoplastic resin may be selected from the group comprising or consisting of polyacrylates, polyurethanes, polyesters, polyvinyl chlorides, polyacetates, polyvinyl pyrrolidones and combinations thereof. In some examples, the second thermoplastic resin may be selected from the group comprising polyacrylates, polyurethanes, polyvinyl butyral resins or polyvinyl chlorides.

In some examples, the second thermoplastic resin may be a polyacrylate-polystyrene copolymer or a polyacrylate-polyurethane copolymer. In some examples, the second thermoplastic resin may be selected from aliphatic urethane acrylates, aromatic urethane acrylates, epoxy acrylates and polyester acrylates.

In some examples, the second thermoplastic resin may be selected from the group comprising nitrocellulose-polyurethane (NC/PU) resin or polyvinyl butyral (PVB) resin.

In some examples, the polyurethane may comprise a linear segmented block copolymer, which may have hard and soft segments. In some examples, the polyurethane resin is formed by reacting a polyisocyanate with a polyol. In some examples, the polyisocyanate is a diisocyanate. In some examples, the polyol is a diol. In some examples, the polyisocyanate is a diisocyanate and the polyol is a diol.

Thermoplastic polyurethane polymers may be formed by the reaction of three components: diisocyanates, long-chain diols (for example, polyester polyols, polyether polyols or polycaprolactones), which may, for example, have a molecular weight of from at least 500 Daltons, and so-called chain extenders, which may be short-chain diols, for example, having a molecular weight of 400 Daltons or less.

In some examples, the further composition comprises 0 wt. % to 50 wt. % second thermoplastic resin, in some examples, 1 wt. % to 45 wt. %, in some examples, 5 wt. % to 40 wt. %, in some examples, 10 wt. % to 35 wt. %, in some examples, 15 wt. % to 30 wt. %, in some examples, 20 wt. % to 25 wt. % second thermoplastic resin. References herein to the wt. % of second thermoplastic resin in the further composition are to the weight of the second thermoplastic resin based on the total weight of the composition, including solvents.

Solvent

In some examples, the further composition comprises a solvent.

In some examples, the further composition described herein comprises second thermoplastic resin coated white pigment particles, which are formed in and/or dispersed in a carrier fluid or solvent. Before deposition on the printed first flexible substrate, the further composition may be in liquid form; and may comprise a solvent in which is suspended the white pigment particles coated with the second thermoplastic resin.

In some examples, the solvent acts as a reaction solvent in preparing the coated white pigment particles, and can also act as a dispersing medium for the other components in the further composition.

In some examples, the solvent used in the further composition may be the same or different from the liquid carrier of the ink composition.

In some examples, after the further composition is deposited, the solvent may evaporate.

In some examples, the solvent may be a solvent in which the cross-linker can dissolve, for example, can dissolve completely.

In some examples, the solvent may be a volatile organic solvent.

In some examples, the solvent may be a polar aprotic solvent. In some examples, the polar aprotic solvent may be selected from water, methyl ethyl ketone, isopropanol, ethyl acetate, tetrahydrofuran, dichloromethane, acetone, dimethylformamide, acetonitrile, dimethylsulfoxide, isopropyl acetate, ethanol and combinations thereof.

Before printing, the solvent may constitute at least 20 wt. % of the further composition, in some examples, at least 25 wt. %, in some examples, at least 30 wt. %, in some examples, at least 35 wt. %, in some examples, at least 40 wt. %, in some examples, at least 45 wt. %, in some examples, at least 50 wt. %, in some examples, at least 55 wt. %, in some examples, at least 60 wt. %, in some examples, at least 65 wt. %, in some examples, at least 70 wt. %, in some examples, at least 75 wt. %, in some examples, at least 80 wt. %, in some examples, at least 85 wt. % of the further composition. Before printing, the solvent may constitute up to 85 wt. % of the further composition, in some examples, up to 80 wt. %, in some examples, up to 75 wt. %, in some examples, up to 70 wt. %, in some examples, up to 65 wt. %, in some examples, up to 60 wt. %, in some examples, up to 55 wt. %, in some examples, up to 50 wt. %, in some examples, up to 45 wt. %, in some examples, up to 40 wt. %, in some examples, up to 35 wt. %, in some examples, up to 30 wt. %, in some examples, up to 25 wt. %, in some examples, up to 20 wt. % of the further composition. In some examples, the solvent may constitute from 20 wt. % to 80 wt. % of the further composition, in some examples, from 25 wt. % to 75 wt. %, in some examples, from 30 wt. % to 70 wt. %, in some examples, from 35 wt. % to 65 wt. %, in some examples, 40 wt. % to 60 wt. %, in some examples, 45 wt. % to 55 wt. %, in some examples, 50 wt. % to 70 wt. % of the further composition.

The further composition, when deposited on the printed first flexible substrate, may be substantially free from solvent. In a further composition deposition process and/or afterwards, the solvent may be removed, for example, by an electrophoresis processes during deposition (for example, printing) and/or evaporation, such that substantially just solids are retained on the printed first flexible substrate. Substantially free from solvent may indicate that the further composition deposited on the printed first flexible substrate contains less than 5 wt. % solvent, in some examples, less than 2 wt. % solvent, in some examples, less than 1 wt. % solvent, in some examples, less than 0.5 wt. % solvent. In some examples, the further composition once deposited on printed first flexible substrate is free from solvent.

In some examples, the further composition is deposited on the printed first flexible substrate by using any standard deposition technique, for example gravure coating, flexo coating, screen coating, offset coating.

In some examples, the further composition is deposited onto the printed first flexible substrate by using a printing machine. In some examples, the further composition is deposited onto the printed first flexible substrate by using a laminator.

Second Flexible Substrate

The second flexible substrate of the flexible packaging material may also be referred to as a functional substrate or simply a base layer. The base layer of the flexible packaging material may be the innermost layer of the flexible packaging material in use, and may thus be in contact with the packaged goods. In some examples, the base layer is referred to as a functional substrate and is functional in the sense that it provides a barrier function to protect the packaged goods. The base layer or functional substrate may serve as a barrier to any external influence that could damage or otherwise reduce the quality of the packaged goods, in particular food, by preventing ingress of, for example, moisture, oxygen, other oxidants and pathogens such as viruses and bacteria.

In some examples, the second flexible substrate comprises a film or sheet, e.g. a thin film or thin sheet, of paper, metallic foil, and/or a plastic material. In some examples, the second flexible substrate comprises a metallic foil or a metallized substrate. In some examples, the second flexible substrate comprises a metallized paper or a metallized plastic film. In some examples, the second flexible substrate comprises an aluminium foil. In some examples, the second flexible substrate comprises a film, e.g. a thin film, of a plastic material, for example, polyethylene (PE), linear low density polyethylene (LLDPE), low density polyethylene (LDPE), medium density polyethylene (MDPE), high density polyethylene (HDPE), polypropylene (PP), cast (cPP) or axially oriented polypropylene (BOPP), oriented polyamide (OPA). In some examples, the second flexible substrate comprises a plurality of layers of film of a plastic material, such as a combination of films selected from PE, LLDPE, PP, BOPP and OPA, laminated together.

In some examples, the second flexible substrate comprises a metallized paper in the form of a paper substrate coated on one surface with a layer of metal, for example, aluminium.

In some examples, the second flexible substrate comprises a metallized plastic film in the form of a polymer substrate coated on one surface with a layer of metal, for example, aluminium. In some examples, the second flexible substrate comprises a metallized plastic film in the form of a metallized BOPP film or a metallized PET film.

In some examples, the second flexible substrate comprises a thin film of material, wherein the film is less than 100 µm in thickness, for example, less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In some examples, the film of material is about 12 µm in thickness.

In some examples, the second flexible substrate comprises a thin film of material, wherein the film is greater than 12 μm in thickness, for example, greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In some examples, the film of material is about 100 μm in thickness.

In some examples, the flexible packaging material comprises a sealant layer disposed on a surface of the second flexible substrate other than a surface of the second flexible substrate to which the printed first flexible substrate is laminated. In some examples, the second flexible substrate has a first surface on which the ink composition is printed and a second surface on which a sealant layer may be disposed. The second surface being a surface other than the surface on which the ink composition is printed, for example, the second surface of the second flexible substrate may be a surface opposing the first surface of the second flexible substrate. In some examples, the sealant layer is disposed on the innermost surface of the flexible packaging material and serves to provide means for sealing the flexible packaging material to itself or another material, with the goods to be packaged inside. In some examples, the sealant layer comprises a film of low-melting, i.e. heat sealable, thermoplastic material. Suitable thermoplastic materials include those described herein in connection with the first thermoplastic resin and/or the second thermoplastic resin and include polymers of ethylene, or DuPont's SURLYN® ionomers. In some examples, the sealant layer comprises an extrudable material.

In some examples, the sealant layer comprises a thin film of a polymer, wherein the film is less than 100 μm in thickness, for example, less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In some examples, the film of polymer is about 12 μm in thickness.

In some examples, the sealant layer comprises a thin film of a polymer, wherein the film is greater than 12 μm in thickness, for example, greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In some examples, the film of polymer is about 100 μm in thickness.

Process for Preparing the Flexible Packaging Material

Described herein is a process for preparing a flexible packaging material comprising:
  providing a printed first flexible substrate comprising an ink composition on a surface of a first flexible substrate, the ink composition comprising a first thermoplastic resin;
  depositing a further composition comprising a cross-linker, a white pigment and a second thermoplastic resin onto the printed ink composition such that the thermoplastic resin of the ink composition is cross-linked; and
laminating the first flexible substrate with a second flexible substrate such that the ink composition and the further composition are disposed between the first and second flexible substrates.

The process described herein is depicted generally in FIG. 1, in which the following reference numerals are used to identify the features indicated: reference numeral "1" denotes a first flexible substrate; reference numeral "2" denotes an ink composition; reference numeral "3" denotes a further composition; reference numeral "4" denotes a second flexible substrate; reference numeral "5" denotes a flexible packaging material.

In some examples, the printed first flexible substrate is provided by printing an ink composition on a surface of the first flexible substrate.

FIG. 1 depicts a process in which a first flexible substrate 1 is provided and an ink composition 2 is printed on to a surface of the first flexible substrate 1. A further composition 3 comprising a cross-linker (for cross-linking the first thermoplastic resin of the ink composition), a white pigment and a second thermoplastic resin is then deposited onto the printed ink composition 2, e.g. printed ink layer 2, disposed on the first flexible substrate 1. A second flexible substrate 4 is then provided. The first flexible substrate 1 having printed ink layer 2 and the further composition 3 disposed thereon is then laminated with the second flexible substrate 4 such that the ink composition 2 and the further composition 3 are disposed between the first and second flexible substrates.

In some examples, printing an ink composition onto a surface of the first flexible substrate 1 may comprise printing any ink composition described herein on a surface of the first flexible substrate by any suitable printing process.

In some examples, the first flexible substrate is provided with a primer on a surface onto which the ink composition is printed. In some examples, the primer is deposited on a surface of the first flexible substrate onto which the ink composition is then printed. In some examples, the primer is deposited on a surface of the first flexible substrate by using any standard deposition technique, for example, gravure coating, flexo coating, screen coating, offset coating, printing (for example, inkjet printing, (dry) electrostatic printing, liquid electrostatic printing).

In some examples, a primer comprising a primer resin is provided on the first flexible substrate. In some examples, the primer is provided in an amount such that the coat weight of the primer resin measured over the area of the first surface of the first flexible substrate is at least $0.01$ g/m$^2$, in some examples, at least $0.05$ g/m$^2$, in some examples, at least $0.1$ g/m$^2$, in some examples, at least $0.15$ g/m$^2$, in some examples, about $0.18$ g/m$^2$. In some examples, the primer is provided in an amount such that the coat weight of the primer resin measured over the area of the first surface of the first flexible substrate is up to about $0.5$ g/m$^2$, in some examples, up to about $0.2$ g/m$^2$, in some examples, up to about $0.5$ g/m$^2$, in some examples, up to about $1$ g/m$^2$, in some examples, up to about $1.5$ g/m$^2$.

In some examples, printing an ink composition onto a surface of the first flexible substrate comprises printing an electrostatic ink composition, e.g. a liquid electrophotographic ink composition, onto a surface of the first flexible substrate in an electrophotographic or electrostatic printing process using an electrophotographic or electrostatic printing apparatus. Examples of suitable electrophotographic or electrostatic printing equipment are the HP Indigo digital presses. In some examples, the process may comprise electrophotographically printing a liquid electrophotographic ink composition onto a surface of the first flexible substrate.

In some examples, an ink composition comprising a thermoplastic resin is printed on a surface of the first flexible substrate in an amount such that the coat weight of the thermoplastic resin measured over the area of the first surface of the first flexible substrate is at least 0.01 g/m$^2$, in some examples, at least 0.05 g/m$^2$, in some examples, at least 0.1 g/m$^2$, in some examples, at least 0.5 g/m$^2$, in some examples, about 1 g/m$^2$. In some examples, the ink composition is printed in an amount such that a coat weight of the thermoplastic resin measured over the area of the first surface of the first flexible substrate is up to about 16 g/m$^2$, in some examples, up to about 10 g/m$^2$, in some examples, up to about 5 g/m$^2$, in some examples, up to about 4 g/m$^2$.

In some examples, the further composition may be applied to the printed ink composition disposed on the first flexible substrate using any suitable coating process. In some examples, the cross-linking composition is deposited onto the printed ink composition using a flexo coating, gravure, offset, or screen printing process. In some examples, the cross-linking composition is applied onto the printed ink composition using a printing machine. In some examples, the cross-linking composition is applied onto the printed ink composition using a laminator.

In examples in which the first flexible substrate has a primer on a surface onto which the ink composition is printed, the further composition may be applied to the printed ink composition and primer on the first flexible substrate which may have been left exposed after printing of the ink composition onto the primer on a surface of the first flexible substrate.

In some examples, depositing the further composition on to the printed ink composition comprises depositing a further composition comprising a cross-linker for cross-linking the thermoplastic resin of the ink composition and a cross-linker for cross-linking the primer resin of the primer. In some examples, depositing the further composition on to the printed ink composition comprises depositing a further composition comprising a cross-linker for cross-linking the thermoplastic resin of the ink composition and for cross-linking the primer resin of the primer. In some examples, depositing the further composition on to the printed ink composition may comprise depositing a further composition for cross-linking the thermoplastic resin of the ink composition and depositing an additional composition comprising a cross-linker for cross-linking the primer resin of the primer. In some examples, the additional composition may be absent of the white pigment and the second thermoplastic resin of the further composition.

In some examples, depositing the further composition onto the printed ink composition results in the cross-linker penetrating into the ink composition on the surface of the first flexible substrate whilst the white pigment and the second thermoplastic resin remain on the surface of the ink composition forming a white layer on the printed ink composition. In some examples, depositing the further composition onto the printed ink composition results in the cross-linker penetrating into the ink composition on the surface of the first flexible substrate whilst the second thermoplastic resin coated white pigment remains on the surface of the ink composition forming a white layer on the printed ink composition. In some examples, depositing the further composition onto the printed ink composition results in the cross-linker penetrating into the ink composition and, if present, into the primer on the surface of the first flexible substrate whilst the white pigment and the second thermoplastic resin remain on the surface of the ink composition forming a white layer on the printed ink composition. In some examples, depositing the further composition onto the printed ink composition results in the cross-linker penetrating into the ink composition and, if present, into the primer on the surface of the first flexible substrate whilst the second thermoplastic resin coated white pigment remains on the surface of the ink composition forming a white layer on the printed ink composition.

In some examples, the further composition is deposited on the printed ink composition disposed on the first flexible substrate in an amount such that the coat weight of the cross-linker measured over the area of the first surface of the first flexible substrate is at least 0.01 g/m$^2$, in some examples, at least 0.02 g/m$^2$, in some examples, at least 0.03 g/m$^2$, in some examples, at least 0.04 g/m$^2$, in some examples, at least 0.05 g/m$^2$, in some examples, at least 0.06 g/m$^2$, in some examples, at least 0.08 g/m$^2$, in some examples, at least 0.1 g/m$^2$, in some examples, at least 0.12 g/m$^2$, in some examples, at least 0.15 g/m$^2$, in some examples, at least 0.18 g/m$^2$, in some examples, at least about 0.2 g/m$^2$, in some examples, at least about 0.3 g/m$^2$, in some examples, at least about 0.4 g/m$^2$, in some examples, at least 0.5 g/m$^2$.

In some examples, the further composition is deposited on the printed ink composition disposed on the first flexible substrate in an amount such that the coat weight of the cross-linker measured over the area of the first surface of the first flexible substrate is up to about 0.4 g/m$^2$, in some examples, up to about 0.8 g/m$^2$, in some examples, up to about 1 g/m$^2$.

In some examples, the further composition is deposited on the printed ink composition disposed on the first flexible substrate in an amount such that the coat weight of the cross-linker measured over the area of the first surface of the first flexible substrate is from about 0.04 g/m$^2$ to about 0.8 g/m$^2$, in some examples, from about 0.04 g/m$^2$ to about 0.4 g/m$^2$, in some examples, from about 0.04 g/m$^2$ to about 0.2 g/m$^2$.

In some examples, the process of preparing a flexible packaging material further comprises activating the cross-linker of the further composition after deposition of the further composition on the printed ink composition disposed on the first flexible substrate to form a crosslinked thermoplastic resin. In some examples, activation of the cross-linker of the further composition results in the formation of a crosslinked thermoplastic resin and a crosslinked primer resin. In some examples, activation of the cross-linker of the further composition results in the formation of a crosslinked thermoplastic resin, a crosslinked primer resin and cross-linking of the primer resin and the thermoplastic resin. In some examples, activation of the cross-linker of the further composition may comprise heating the cross-linking composition. In some examples, activation of the cross-linker of the further composition comprises heating the further composition to evaporate the solvent. In some examples, activation of the cross-linker of the further composition comprises heating the further composition to a temperature of at least 50° C., in some examples, at least 60° C., in some examples, at least 70° C., in some examples, at least 80° C., in some examples, at least 90° C., in some examples, at least 100° C., in some examples, at least 110° C., in some examples, at least 120° C., in some examples, up to about 200° C.

In some examples, the crosslinking of the thermoplastic resin by the cross-linker and/or the crosslinking of the primer resin by the cross-linker is initiated and/or promoted by light (photoinitiation), such as ultraviolet light (UV photoinitiation); heat (thermal initiation); electron beam (e-beam initiation); ionising radiation, such as gamma radiation (gamma initiation); non-ionising radiation, such as microwave radiation (microwave initiation); or any combination thereof.

In some examples, the further composition is activated after deposition on the printed ink composition disposed on the first flexible substrate. In some examples, the further composition is activated prior to lamination of the first flexible substrate with the second flexible substrate. In some examples, the further composition is activated after lamination of the first flexible substrate with the second flexible substrate.

In some examples, the second thermoplastic resin of the further composition is not cross-linked by the cross-linker. In some examples, the second thermoplastic resin does not contain any functionality capable of reacting with the cross-linker to cross-link the second thermoplastic resin.

In some examples, laminating the first flexible substrate with a second flexible substrate comprises using an adhesive, for example, a solvent-based adhesive, a solvent-less adhesive or a water based adhesive, to adhere the first and second flexible substrates. In some examples, the adhesive is a solvent based adhesive, for example, a polyurethane or epoxy based adhesive. In some examples, the adhesive is a solvent-less adhesive, for example, a polyurethane, or UV or electron beam curable adhesive. In some examples, the adhesive is a water-based adhesive, for example, an adhesive comprising polyurethane or acrylic resins.

In some examples, laminating the first flexible substrate with a second flexible substrate comprises applying an adhesive, for example, a solvent-based adhesive, to a surface of the first flexible substrate printed with the ink composition and coated with a further composition, and then contacting the second flexible substrate with the adhesive disposed on the ink composition and further composition coated first flexible substrate. In some examples, laminating the first flexible substrate with a second flexible substrate comprises applying an adhesive, for example, a solvent-based adhesive, to a first surface of the second flexible substrate and then contacting the first flexible substrate with the adhesive disposed on the second flexible substrate.

In some examples, lamination may be carried out on any apparatus suited for performing such a task (e.g. LaboCombi from Nordmeccania). The laminating apparatus on which the lamination may be carried out may comprise nip rolls. Lamination carried out on the nip roll may be carried out at a pressure sufficient to adhere the adhesive on the second flexible substrate with the ink-composition and further composition and/or primer disposed on the first flexible substrate and thereby create a bond between the materials.

In some examples, the pressure for lamination or the laminating nip may be less than about 10 bar, for example, less than about 9 bar, for example, less than about 8 bar, for example, less than about 7 bar, for example, less than about 6 bar, for example, less than about 5 bar, for example, less than about 4 bar, for example, less than about 3 bar, for example, about 2 bar.

In some examples, the pressure for lamination or the laminating nip may be greater than about 2 bar, for example, greater than about 3 bar, for example, greater than about 4 bar, for example, greater than about 5 bar, for example, greater than about 6 bar, for example, greater than about 7 bar, for example, greater than about 8 bar, for example, greater than about 9 bar, for example, about 10 bar.

In some examples, lamination is carried out at a temperature in the range of about 30° C. to 100° C.

In some examples, lamination is carried out at a temperature of at least about 30° C., in some examples, at least about 40° C., in some examples, at least about 50° C., in some examples, at least about 60° C.

In some examples, lamination is carried out at a temperature of up to about 100° C. In some examples, lamination is carried out at a temperature of about 60 C.

In some examples, the second flexible substrate has a second surface on which a sealant layer is disposed. In some examples, the second surface is a surface of the second flexible substrate other than a surface of the second flexible substrate to which the first flexible substrate is laminated. In some examples, the sealant layer may be deposited on the second surface of the second flexible substrate before lamination of the first and second flexible substrates. In some examples, the sealant layer may be deposited on the second surface of the second flexible substrate after lamination of the first and second flexible substrates.

In some examples, providing a sealant layer on the second flexible substrate comprises depositing a sealant material to form a sealant layer on the second surface of the second flexible substrate. The material used to form the sealant layer may be as described previously. Deposition of the sealant material onto the second surface of the second flexible substrate may take place by any suitable process, for example, extrusion coating, flexo coating, gravure or screen printing. In some examples, the second flexible substrate and sealant layer are pre-formed as a functional substrate.

In some examples, the process comprises:
  providing a first flexible substrate;
  printing an ink composition on a surface of the first flexible substrate, the ink composition comprising a first thermoplastic resin;
  depositing a further composition comprising a cross-linker, a white pigment and a second thermoplastic resin onto the printed ink composition such that the thermoplastic resin of the ink composition is cross-linked; and
  laminating the first flexible substrate with a second flexible substrate such that the ink composition, the further composition and the cross-linker are disposed between the first and second flexible substrates.

In some examples, the process comprises:
  providing a first flexible substrate comprising a primer on a surface of the first flexible substrate, the primer comprising a primer resin comprising an amine functional group;
  printing an ink composition comprising a first thermoplastic resin onto the primer on the surface of the first flexible substrate, the first thermoplastic resin comprising a polymer having acidic side groups;
  depositing a further composition comprising a cross-linker, a white pigment and a second thermoplastic resin, the cross-linker selected from an epoxy-based cross-linker, a aziridine-based cross-linker, an isocyanate-based cross-linker and a carbodiimide-based cross-linker, onto the printed ink composition disposed on the primer on the surface of the first flexible substrate such that the first thermoplastic resin of the ink composition is crosslinked, the primer resin of the primer is crosslinked and the first thermoplastic resin of the ink composition is crosslinked with the primer resin of the primer; and
  laminating the first flexible substrate with a second flexible substrate such that the primer, printed ink composition and the further composition are disposed between the first and second flexible substrates.

In some examples, the flexible packaging material may comprise:
- a first flexible substrate comprising a primer on a surface of the first flexible substrate, the primer comprising a primer resin comprising an amine functional group;
- a cross-linked printed ink layer comprising a first thermoplastic resin disposed on the first flexible substrate, the first thermoplastic resin comprising a polymer having acidic side groups;
- a further layer comprising a white pigment and a second thermoplastic resin disposed on the printed ink layer; and
- a second flexible substrate laminated to the first flexible substrate such that the printed ink layer and the cross-linker are disposed between the first and second flexible substrates;
- wherein the cross-linked printed ink layer has been formed from a cross-linker selected from an epoxy-based cross-linker, a aziridine-based cross-linker, an isocyanate-based cross-linker and a carbodiimide-based cross-linker applied to the printed ink layer such that the first thermoplastic resin is crosslinked, the primer resin is crosslinked and the first thermoplastic resin and the primer resin are crosslinked.

In some examples, the flexible packaging material may comprise:
- a first flexible substrate comprising a primer on a surface of the first flexible substrate, the primer comprising a primer resin comprising an amine functional group;
- a cross-linked printed ink layer comprising a first thermoplastic resin disposed on the first flexible substrate, the first thermoplastic resin comprising a polymer having acidic side groups;
- a further layer comprising a white pigment and a second thermoplastic resin disposed on the printed ink layer; and
- a second flexible substrate laminated to the first flexible substrate such that the printed ink layer and the cross-linker are disposed between the first and second flexible substrates;
- wherein the cross-linked printed layer comprises cross-links derived from a cross-linker selected from an epoxy-based cross-linker, an aziridine-based cross-linker, an isocyanate-based cross-linker and a carbodiimide-based cross-linker; and wherein the first thermoplastic resin is crosslinked, the primer resin is crosslinked and the first thermoplastic resin and the primer resin are crosslinked.

In some examples, the process comprises:
- providing a first flexible substrate comprising a primer on a surface of the first flexible substrate, the primer comprising a primer resin comprising an amine functional group;
- printing an ink composition comprising a first thermoplastic resin onto the primer on the surface of the first flexible substrate, the first thermoplastic resin comprising a polymer having acidic side groups;
- depositing a further composition comprising an epoxy-based cross-linker or an aziridine-based cross-linker, a white pigment and a second thermoplastic resin onto the printed ink composition disposed on the primer on the surface of the first flexible substrate such that the first thermoplastic resin of the ink composition is crosslinked, the primer resin of the primer is crosslinked and the first thermoplastic resin of the ink composition is crosslinked with the primer resin of the primer; and
- laminating the first flexible substrate with a second flexible substrate such that the primer, printed ink composition and the further composition are disposed between the first and second flexible substrates.

In some examples, the flexible packaging material may comprise:
- a first flexible substrate comprising a primer on a surface of the first flexible substrate, the primer comprising a primer resin comprising an amine functional group;
- a cross-linked printed ink layer comprising a first thermoplastic resin disposed on the first flexible substrate, the first thermoplastic resin comprising a polymer having acidic side groups;
- a further layer comprising a white pigment and a second thermoplastic resin disposed on the printed ink layer; and
- a second flexible substrate laminated to the first flexible substrate such that the printed ink layer and the cross-linker are disposed between the first and second flexible substrates;
- wherein the cross-linked printed ink layer has been formed from an epoxy-based cross-linker applied to the printed ink layer such that the first thermoplastic resin is crosslinked, the primer resin is crosslinked and the first thermoplastic resin and the primer resin are crosslinked.

In some examples, the flexible packaging material may comprise:
- a first flexible substrate comprising a primer on a surface of the first flexible substrate, the primer comprising a primer resin comprising an amine functional group;
- a cross-linked printed ink layer comprising a first thermoplastic resin disposed on the first flexible substrate, the first thermoplastic resin comprising a polymer having acidic side groups;
- a further layer comprising a white pigment and a second thermoplastic resin disposed on the printed ink layer; and
- a second flexible substrate laminated to the first flexible substrate such that the printed ink layer and the cross-linker are disposed between the first and second flexible substrates;
- wherein the cross-linked printed ink layer comprises cross-links derived from an epoxy-based cross-linker applied to the printed ink layer such that the first thermoplastic resin is crosslinked, the primer resin is crosslinked and the first thermoplastic resin and the primer resin are crosslinked.

EXAMPLES

The following illustrates examples of the materials, methods and related aspects described herein. Thus, these examples should not be considered as restricting the present disclosure, but are merely in place to teach how to make examples of compositions of the present disclosure. As such, a representative number of compositions and their method of manufacture are disclosed herein.

Example 1

A printed first flexible substrate comprising a primer on a surface of the first flexible substrate and an ink composition on the primer on a surface of the first flexible substrate was prepared by providing a polyethylene terephthalate film (PET film; 12 μm thick) which was primed with DP050 (primer containing polyethylene imine as the primer resin, available from Michelman). The primer was applied such that the coat weight of polyethylene imine as the primer resin was 0.18 g/m².

An image was electrostatically printed using an HP Indigo 20000 press and ElectroInk® 4.5 (available from HP Indigo; a liquid electrophotographic ink composition comprising a thermoplastic resin comprising ethylene acrylic acid and ethylene methacrylic acid copolymers) on the PET film. No HP Indigo white ink was used. The image included non-printed areas and the printed areas had an ElectroInk® coverage of 0 up to 360% (up to 1 g/m² coat weight of the first thermoplastic resin on the PET film).

The further composition was prepared by diluting retort grade white ink (Siegwerk PV77, which contains 20 to 30 wt. % $TiO_2$ as the white pigment) with ethyl acetate (50 wt. %) and shaking for 10 min. 7-Oxabicyclo[4.1.0]hept-3-ylmethyl 7-oxabicyclo[4.1.0]heptane-3-carboxylate (5 wt. %; Indigicot S105, available from Lambson) was then added and the resulting solution was shaken for 10 min, resulting in a further composition having a viscosity of 23 sec according to ISO #4 determined by following the standard test method for viscosity of paints and related materials by ISO flow cups (ASTM D5125-10(2014)).

The printed material was coated with the further composition by using a laboratory laminator (LaboCombi, Nordmeccanica). The coating speed was 12 m/min, the three ovens were at temperatures of 70° C., 100° C. and 120° C. (alternatively, a two dryer laminator using ovens at 90° C. and 120° C. or a one dryer laminator using an oven at 100° C. could be used) and the nip temperature was 80° C. (60-120° C.). The further composition was applied using anilox roller 40 for high white opacity and anilox roller 140 for low white opacity. The coated first flexible substrate was cured at 50° C. overnight.

A second flexible substrate comprising a tri-laminate of oriented polyamide, aluminium and cast polypropylene (OPA/Alu/cPP; 8 μm/15 μm/80 μm) was laminated with the first flexible substrate such that the ink composition and the further composition are disposed between the first and second flexible substrates (with the OPA layer of the second flexible substrate contacting the printed first flexible substrate). The lamination was achieved by applying a high performance solvent based adhesive (Morchem 246+90 in ethyl acetate) to a first surface of the second flexible substrate and laminating the second flexible substrate to the coated first flexible substrate with the laboratory laminator used to apply the further composition such that the solvent based adhesive contacted the coated first flexible substrate. Although this test has been performed with an OPA/Alu/cPP laminate, an Alu/OPA/cPP laminate could also be used.

Example 2

A flexible packaging material was prepared according to Example 1, except that the first flexible substrate used was a high barrier polyethylene terephthalate film (PET H. B.; PET-$SiO_x$ film; 12 μm) and the second flexible substrate used was a di-laminate of oriented polypropylene and cast polypropylene (OPA/cPP; 15 μm/80 μm) and the first and second flexible substrates layers were laminated together such that the OPA layer of the second flexible substrate contacts the printed first flexible substrate.

Reference Example 1

A flexible packaging material was prepared according to Example 1 or 2, except that a layer of white LEP ink (ElectroInk® 4.5; available from HP Indigo) was printed as the final LEP ink and then a clear further composition was coated over the printed material. The clear further composition contained 5 wt. % Indigicot S105 only in ethyl acetate.

Reference Example 2

A flexible packaging material was prepared according to Example 1 or 2, except that instead of the further composition, a conventional retort white ink was used (Siegwerk PV77, which contains 20 to 30 wt. % $TiO_2$ as the white pigment), and diluted with ethyl acetate (50 wt. %).

Reference Example 3

A flexible packaging material was prepared according to Example 1 or 2, except that instead of depositing the further composition, a layer of white LEP ink (ElectroInk® 4.5; available from HP Indigo) was LEP printed over the image.

Test 1—Water Resistance

Water resistance is one of the key parameters for a successful lamination for high performance applications. Water resistance is tested prior to lamination. Samples of the first flexible substrates prepared according to Examples 1 and 2 and Reference Examples 1 to 3 (that is, the preparation process was stopped prior to laminating the second flexible substrate onto the first flexible substrate). Each sample was immersed in water at room temperature (20° C.) for 0.5 hours and 24 hours. Next, the printed surface was dried with a cloth and immediately taped with an adhesive tape (3M 810). The tape was pressed 4 times with a 4 Kg roller and then pulled from the print. The amount of ink left on the printed material is listed in Table 1 below.

TABLE 1

| | | | | Ink adhesion [%] | | |
| --- | --- | --- | --- | --- | --- | --- |
| Example | First flexible substrate | Cross-linker coat weight [g/m²] | White pigment coat weight [g/m²] | Dry | Immersed in Water (0.5 h) | Immersed in Water (24 h) |
| Ref. Ex. 3 | PET | N/A | N/A | 99 | 30 | 10 |
| Ref. Ex. 1 | PET | 0.14 | N/A | 100 | 100 | 95 |
| Ref. Ex. 2 high opacity | PET | N/A | 2.8 | 100 | 95 | 85 |
| Ex. 1 high opacity | PET | 0.12 | 2.8 | 100 | 100 | 100 |
| Ex. 1 low opacity | PET | 0.14 | 0.8 | 100 | 100 | 100 |

TABLE 1-continued

|  |  |  |  | Ink adhesion [%] | | |
|---|---|---|---|---|---|---|
| Example | First flexible substrate | Cross-linker coat weight [g/m$^2$] | White pigment coat weight [g/m$^2$] | Dry | Immersed in Water (0.5 h) | Immersed in Water (24 h) |
| Ref. Ex. 3 | PET-SiO$_x$ | N/A | N/A | 99 | 30 | 20 |
| Ref. Ex. 1 | PET-SiO$_x$ | 0.14 | N/A | 100 | 99 | 100 |
| Ex. 2 low opacity | PET-SiO$_x$ | 0.14 | 0.8 | 100 | 100 | 100 |

Ex. 1: further composition applied;
Ref. Ex. 1: white LEP ink layer + clear cross-linking composition (no white pigment in the further composition);
Ref. Ex. 2: conventional retort white ink (no cross-linker in the further composition);
Ref. Ex. 3: white LEP ink layer (no further composition).

The water resistance of the substrate of Examples 1 and 2, that is, with the further composition applied (Indigicot S105 mixed with conventional white ink), was as high (100-95%) as the water resistance of the substrate of Reference Example 1, that is, with a white LEP ink layer followed by a clear cross-linking composition (i.e., Indigicot S105 only in ethyl acetate). None of the ink peeled off either the substrate of Example 1 or the substrate of Reference Example 1. This result is in agreement with the added value of the use of a clear cross-linking composition recoded so far.

The water resistance of the substrate of Reference Example 2, that is, with a conventional white ink applied (the further composition without the cross-linker added) was lower (85% after 24 h). The water resistance of the substrate of Reference Example 3, that is with a white LEP ink layer and no further composition applied, was 10-20%; it is known that LEP prints have limited water resistance.

Test 2—Lamination Bond Strength

Lamination bond strength (LBS) is a standard test to evaluate the performance of the laminate (ASTM F0904-98R08). In these examples, the lamination bond strength was measured 30 days after lamination. Here the bond strengths were tested for printed substrate with high ink coverage (up to 360%). Measuring the bonds between the printed and the second substrates allows the prediction of whether a flexible package comprising the flexible packaging material will withstand high performance applications.

When the measurement results in tearing, the adhesion of the first flexible substrate to the second flexible substrate is very strong and there is no possibility separate them, making it impossible to measure the lamination bond strength as the material (usually the first flexible substrate) tears prior to delamination. Results of the lamination bond strength tests are shown in Table 2 below.

TABLE 2

| Example | First flexible substrate | Avg. for coverages of 300% to 360% [N/in] | STD [N/in] | Common failure | Avg. for coverages of 200% to 260% [N/in] | STD [N/in] | Common failure |
|---|---|---|---|---|---|---|---|
| Ref. Ex. 3 | PET | 3.9 | 0.2 | PT 30% | 3.4 | 0.6 | PT 30% |
| Ref. Ex. 1 | PET | Tear | | | Tear | | |
| Ref. Ex. 2 high opacity | PET | 2.7 | | | 4.2 | | |
| Ex. 1 high opacity | PET | Tear | | | Tear | | |
| Ex. 1 low opacity | PET | Tear | | | Tear | | |
| Ref. Ex. 3 | PET-SiO$_x$ | Tear | | | Tear | | |
| Ref. Ex. 1 | PET-SiO$_x$ | Tear | | | Tear | | |
| Ex. 2 low opacity | PET-SiO$_x$ | Tear | | | Tear | | |

Common failure: describes the behaviour of the ElectroInk ® layer when the laminate separates from the printed film;
PT: partial ink transfer from the first flexible substrate to the second flexible substrate;
Tear: tearing of a flexible substrate (usually the first flexible substrate) occurs prior to delamination;
STD: standard deviation.

Ink coverages used in the lamination bond strength test:

| Colour | Coverage [%] | | | | | | | |
|---|---|---|---|---|---|---|---|---|
| C | 0 | 90 | 66 | 0 | 50 | 100 | 66 | 100 |
| M | 100 | 90 | 66 | 100 | 50 | 0 | 66 | 0 |
| Y | 100 | 90 | 66 | 100 | 50 | 0 | 66 | 100 |
| K | 100 | 90 | 100 | 0 | 50 | 100 | 66 | 50 |
| Total | 300 | 360 | 300 | 200 | 200 | 200 | 260 | 250 |

As can be seen from Table 2, the lamination bond strengths of the laminates was very high, resulting in tearing of the flexible substrates prior to delamination. The lamination bond strengths from Reference Examples 2 and 3 with PET as the first flexible substrate laminated to OPA/Alu/cPP as the second flexible substrate (that is, without the cross-linker and either with a layer of white LEP ink or white retort ink) resulted in moderate lamination bond strengths of between 2 N/inch and 4 N/inch.

Retort Pouch Preparation

Flexible packages filled with hot water were prepared from the flexible packaging materials prepared according to Examples 1 and 2 and Reference Examples 1 to 3 in order to determine the suitability of the flexible packaging materials for use in retort pouches and the sealing of the pouches. Flexible packages (17 cm by 14 cm; in the form of pouches) filled with 100 mL of hot water (80° C.) were prepared by sealing at the pouch edges using a hot sealer (Teflon upper jaw, silicon and Teflon lower jaw; jaw temperature: 120° C.; with a force of 450 N; sealing time: two times 0.6 seconds).

Test 3—Retort Pouch Performance

Pouches were subjected to retort conditions, that is, were placed in an autoclave (Tuttnauer Elara 9i) at 125° C. for 30 min. Results of tests performed after retort are shown in Table 3. No ink colour change was seen in the sealing area or pouch area of the retort pouches either before or after retort. The use of the cross-linker reinforces the ink matrix and prevents ink movement upon melting/sealing. After the pouches were subjected to retort conditions, the retort pouches were visually inspected for tunnelling (laminate-printed film separation with tunnelling appearance on different pouch areas) and the lamination bond strengths after retort were determined. Results are shown in Table 3 below.

the final ink layer on a printed first flexible substrate followed by applying a (transparent) cross-linking composition (Indigicot S105). Thus, when a flood coat of white ink is required in flexible packaging material, a further composition (comprising a white pigment, a cross-linker and a second thermoplastic resin) is advantageous and performs as well as using a white LEP ink layer in combination with a transparent cross-linking composition. The further composition (comprising white pigment, second thermoplastic resin and cross-linker) provides LEP printed flexible packaging material with greater strength, significantly reduces the white ink cost outlay and improves LEP print press productivity by reducing motion profile from a five layer motion profile for a full colour image to a four layer motion profile. HP Indigo digital printing presses print each colour as consecutive layers, with each layer taking approximately 0.5 seconds to produce. Thus, by removing the requirement to print a white layer, each image can be produced more quickly, significantly increasing the overall productivity of a printing press. These advantages are provided without reducing the functionality of the high performance flexible packaging material produced with a non-pigmented (clear) cross-linking composition.

TABLE 3

| Example | First flexible substrate | Low ink coverage Pouch area | Low ink coverage seal area | High ink coverage Pouch area | High ink coverage seal area | Lamination Bond Strength after retort [N/inch] | Failure |
|---|---|---|---|---|---|---|---|
| Ref. Ex. 3 | PET | 1-2 | 1-2 | 1-2 | 1-2 | 3.5 | PT 30% |
| Ref. Ex. 1 | PET | None | None | None | None | CBO | |
| Ref. Ex. 2 high opacity | PET | 1-2 | None | 1-2 | None | CBO | |
| Ref. Ex. 2 high opacity | PET | 1-2 | 1-2 | 1-2 | 1-2 | Tear | |
| Ex. 1 low opacity | PET | 1-2 | None | 1-2 | None | CBO | |
| Ref. Ex. 3 | PET-SiO$_x$ | 1-2 | 1-2 | 1-2 | 1-2 | Tear | |
| Ref. Ex. 1 | PET-SiO$_x$ | 1-2 | 1-2 | 1-2 | 1-2 | Tear | |
| Ex. 2 low opacity | PET-SiO$_x$ | 1-2 | 1-2 | 1-2 | 1-2 | Tear | |

CBO: Cannot be opened as the printed first flexible material cannot be separated from the second flexible substrate;
None: no tunnelling and no delamination;
1-2: 1 to 2 small tunnels visible.

The appearance of all pouches was good. No and up to one tunnel was visible after retort. The lamination bond strength of all samples was also very good and values could not be determined form many of the flexible packages as the flexible packaging material either tore or the package could not be opened. The only sample for which the lamination bond strength could be measured was the Reference Example 3, which included a white LEP layer and no cross-linker (after retort=3.5 N/inch).

CONCLUSIONS

Flexible packaging material created by applying a further composition (comprising a conventional retort grade white ink mixed with a cross-linker (Indigicot S105)) to a printed first flexible substrate performs as well as flexible packaging material created by printing a white Indigo LEP ink layer as

The invention claimed is:

1. A process for preparing a flexible packaging material comprising:

providing a first flexible substrate comprising an ink composition printed on a surface of the first flexible substrate, the printed ink composition comprising a first thermoplastic resin;

depositing a further composition comprising a cross-linker, a white pigment and a second thermoplastic resin that is absent groups that can form a bond with the cross-linker onto the printed ink composition;

activating the cross-linker of the further composition such that the first thermoplastic resin of the printed ink composition is cross-linked; and laminating the first flexible substrate with a second flexible substrate such that the printed ink composition and the further composition are disposed between the first and second flexible substrates.

2. The process for preparing the flexible packaging material according to claim 1, wherein the printed ink composition is an electrostatic ink composition.

3. The process for preparing the flexible packaging material according to claim 1, wherein the first flexible substrate comprises a primer disposed between the printed ink composition and the surface of the first flexible substrate, the primer comprising a primer resin.

4. The process for preparing the flexible packaging material according to claim 1, wherein the further composition is deposited onto the printed ink composition using a flexo coating, gravure, offset or screen printing process.

5. The process for preparing the flexible packaging material according to claim 1, wherein the white pigment is selected from the group consisting of $TiO_2$, calcium carbonate, zinc oxide, alumina-$TiO_2$, barium sulphate and mixtures thereof.

6. The process for preparing the flexible packaging material according to claim 1, wherein the second thermoplastic resin comprises a polyurethane resin.

7. The process for preparing the flexible packaging material according to claim 1, wherein the cross-linker is selected from the group consisting of an epoxy cross-linker, an aziridine cross-linker, an isocyanate cross-linker and a carbodiimide cross-linker.

8. The process for preparing the flexible packaging material according to claim 1, wherein the further composition comprises the white pigment in an amount of 9 wt. % to 15 wt. %.

9. The process for preparing the flexible packaging material according to claim 1, wherein the further composition comprises the cross-linker in an amount of 1 wt. % to 10 wt. %.

10. The process for preparing the flexible packaging material according to claim 1, wherein the further composition comprises the second thermoplastic resin in an amount of 1 wt. % to 50 wt. %.

11. The process for preparing the flexible packaging material according to claim 1, wherein the further composition comprises a solvent.

12. The process for preparing the flexible packaging material according to claim 11, wherein the solvent is selected from the group consisting of ethyl acetate, tetrahydrofuran, dichloromethane, acetone, dimethylformamide, acetonitrile, and dimethylsulfoxide.

13. The process for preparing the flexible packaging material according to claim 11, wherein the solvent constitutes 25 wt. % or more of the further composition.

14. The process for preparing the flexible packaging material according to claim 1, wherein activating the cross-linker is accomplished by light; heat; electron beam; ionizing radiation; non-ionizing radiation; or any combination thereof.

15. The process for preparing the flexible packaging material according to claim 1, wherein the first thermoplastic resin is selected from the group consisting of acrylic acid resins, methacrylic acid resins, polyurethane resins, polyethylene imine resins, polyamide resin, polyvinyl alcohol, and combinations thereof.

16. The process for preparing the flexible packaging material according to claim 1, wherein an adhesive used in laminating the first flexible substrate with a second flexible substrate is selected from the group consisting of an epoxy adhesive and an acrylic resin adhesive.

* * * * *